United States Patent [19]
Furuta et al.

[11] Patent Number: 5,600,648
[45] Date of Patent: Feb. 4, 1997

[54] SDH TRANSMISSION SYSTEM

[75] Inventors: Tomohisa Furuta, Osaka; Kouji Tanonaka, Kawasaki; Yasuo Takami, Osaka, all of Japan

[73] Assignee: Fujitsu Limited, Kanagawa, Japan

[21] Appl. No.: 375,283

[22] Filed: Jan. 19, 1995

[30] Foreign Application Priority Data

Mar. 18, 1994 [JP] Japan .................................. 6-049349

[51] Int. Cl.⁶ .................................................. H04J 3/12
[52] U.S. Cl. .......................... 370/248; 370/384; 370/505
[58] Field of Search .............................. 370/68.1, 79, 84, 370/99, 102, 110.1, 112; 371/5.1, 37.1, 37.7

[56] References Cited

U.S. PATENT DOCUMENTS

| | | | |
|---|---|---|---|
| 5,299,234 | 3/1994 | Nakagawa et al. | 370/102 |
| 5,331,641 | 7/1994 | Parruck et al. | 370/102 |
| 5,335,223 | 8/1994 | Iino | 370/84 |
| 5,341,376 | 8/1994 | Yamashita | 370/94.1 |
| 5,434,858 | 7/1995 | Shimada | 370/110.1 |

FOREIGN PATENT DOCUMENTS 4-79629  3/1992  Japan .

*Primary Examiner*—Benedict V. Safourek
*Attorney, Agent, or Firm*—Helfgott & Karas

[57] ABSTRACT

An SDH transmission system including a container selection unit for selectively extracting a specific virtual container VC-m of a particular hierarchy from among the uppermost layer virtual containers VC-4 obtained from a demapping circuit that is a part of the SDH transmission system, and a path overhead processing unit for processing the path overhead of the specific virtual container VC-m obtained from the container selection means. Whereby, it is possible to extract and check the path overhead of the through path and to facilitate maintenance and inspection.

17 Claims, 23 Drawing Sheets

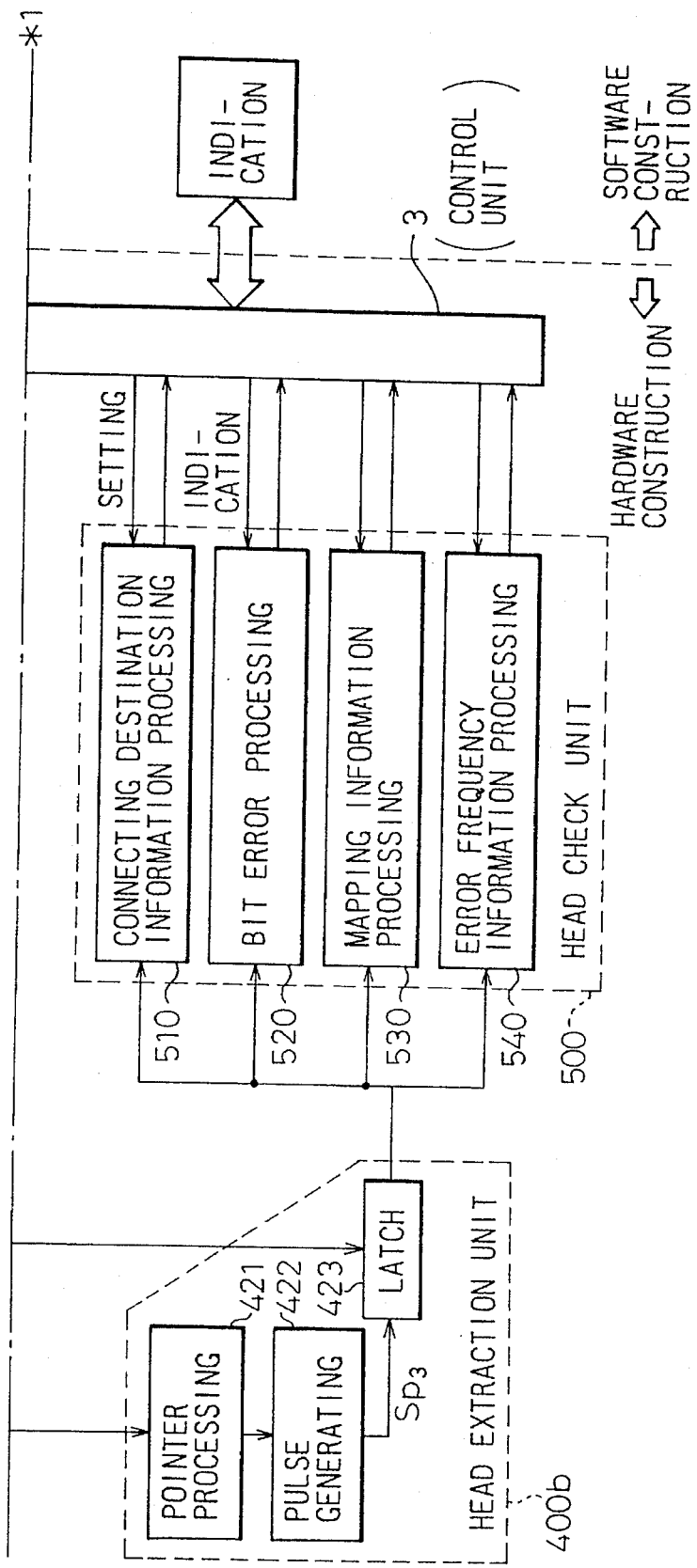

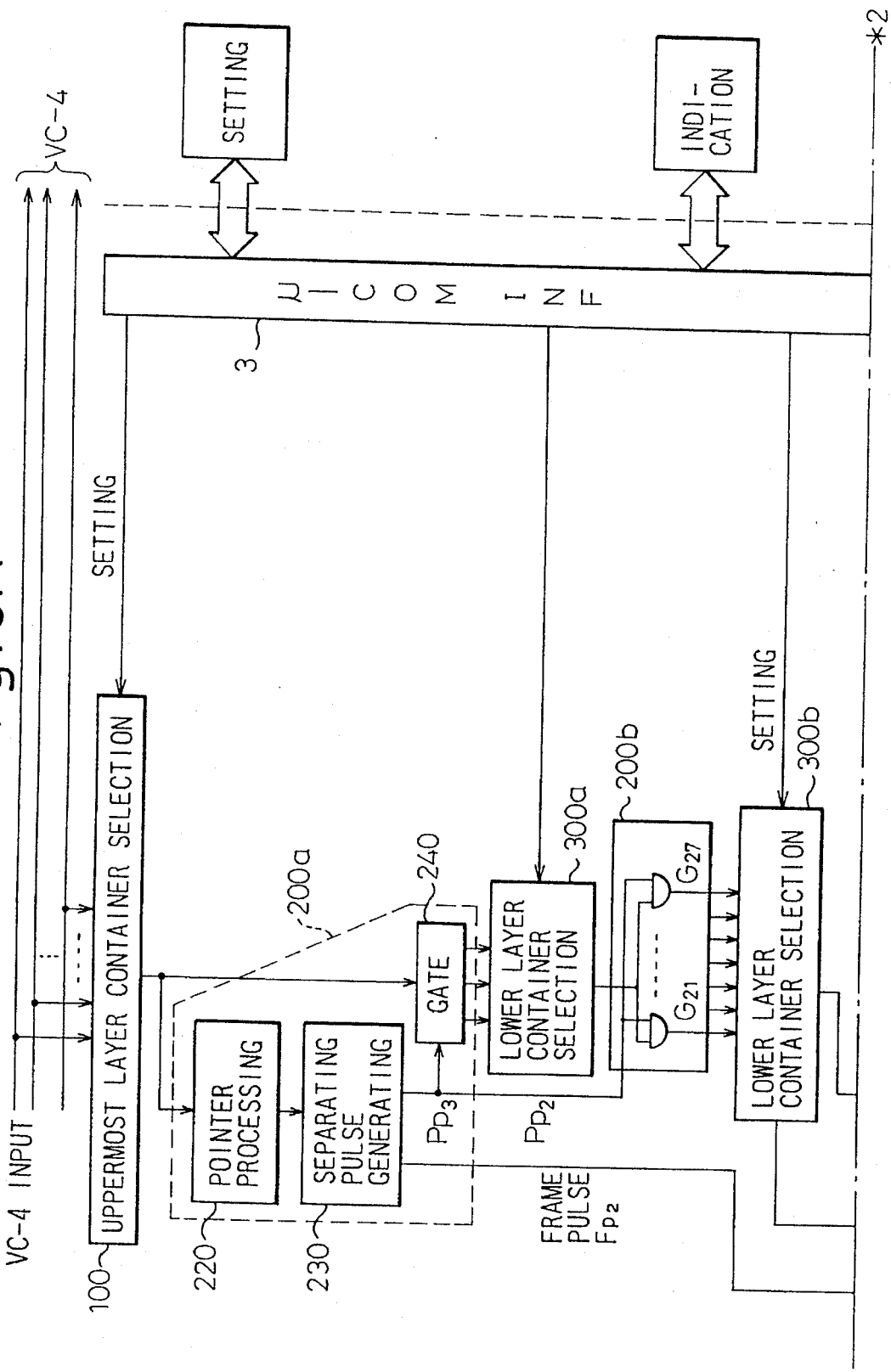

SDH TRANSMISSION SYSTEM

BACKGROUND OF THE INVENTION

1. Field of the Invention

The present invention relates to a synchronous digital hierarchy (SDH) transmission system, more particularly to an apparatus for monitoring through-paths in such a system.

2. Description of the Related Art

As will be explained in detail later with reference to the drawings, in a conventional SDH transmission system, the path overhead POH can only be detected by the SDH equipment terminating the path. When an error occurs during transmission over a certain path, however, it is not possible to judge at what stage (at what end office) the error occurred and consequently time is taken for ascertaining the source of the error and recovering the same. Accordingly, in recent years, even the CCITT has established a new protocol so as to enable monitoring of the control bytes or control bits making up a path overhead during transmission, but no equipment satisfying that protocol has yet been developed.

SUMMARY OF THE INVENTION

The present invention was made in consideration of the above situation and has as its object the provision of an SDH transmission system which enables detection of the desired path overhead of a path and a check of its content not only by the terminating equipment of the path, but also the one or more equipment passed through.

To attain the above object, the present invention provides a container selection means for selectively extracting a specific virtual container VC-m of a particular hierarchy from among the uppermost layer virtual containers VC-4 obtained from a demapping means constituting a part of the SDH transmission system and a path overhead processing means for processing the path overhead of the specific virtual container VC-m obtained from the above container selection means. Thanks to this configuration, it is possible to extract and check the path overhead of the through path and therefore to facilitate maintenance and inspection.

BRIEF DESCRIPTION OF THE DRAWINGS

The above objects and features of the present invention will be more apparent from the following description of the preferred embodiments with reference to the accompanying drawings, wherein:

FIGS. 4A and 4B are block diagrams of an embodiment of the present invention;

FIGS. 5A and 5B are block diagrams of an embodiment of the present invention;

DESCRIPTION OF THE PREFERRED EMBODIMENTS

Before describing the embodiments of the present invention, the related art and the disadvantages therein will be described with reference to the related figures.

Figure 13:
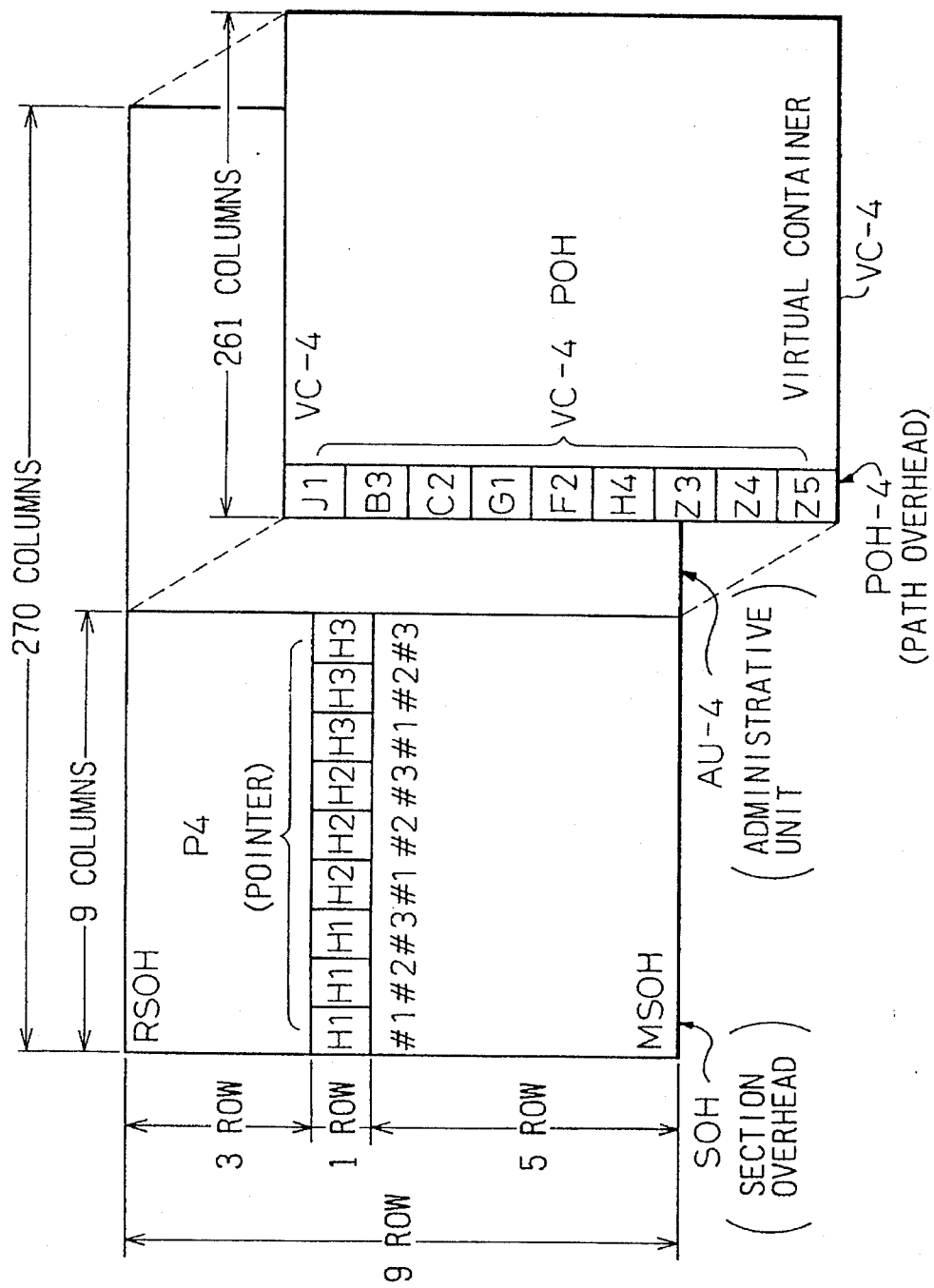
FIG. 13 is a conceptual view of a synchronous transport module and a virtual container VC-4.

The basic unit STM-1 of a synchronous transport module STM-n (wherein, n is a suffix indicating the size of the STM), the unit of transport in the SDH transmission system, as shown in FIG. 13, is composed of a section overhead SOH and a virtual container VC-m (wherein, m is a suffix indicating the size of the virtual container accommodated in the STM, in this case 4). The section overhead SOH carries the control information required for transmission, while the virtual container VC-4 is the significant data portion. In FIG. 13, one column on the horizontal axis is one byte. The transmission is successively achieved from the left byte to the right byte of the first row on the drawing and then sent in the order of the second row, third row, and onward.

The section overhead SOH contains a regenerator section overhead (RSOH) and a multiplexer section overhead (MSOH). In the present invention, a pointer byte (hereinafter referred to as a "pointer") P4 in the MSOH showing the position in the virtual container VC-m of the connecting destination byte J1 carrying the connecting destination information is important. The data of the state of coupling of the pointer P4 and the virtual container VC-4 is referred to as the administrative unit AU-4.

Relative to the administrative unit AU-4, the phase of the virtual container VC-4 composing the administrative unit AU-4 is indefinite. Therefore, the pointer P4 of the virtual container VC-4 shown in FIG. 13 has written in it the position of the header byte of the virtual container VC-4, that is, the connecting destination byte J1.

The connecting destination byte J1 can be read from the pointer P4 of the administrative unit AU-4. Further, the header part of the virtual container VC-4 carries the path overhead POH-4 consisting of the various types of control bytes shown in Table 1 (explained later) including the above-mentioned connecting destination byte J1.

Figure 12:
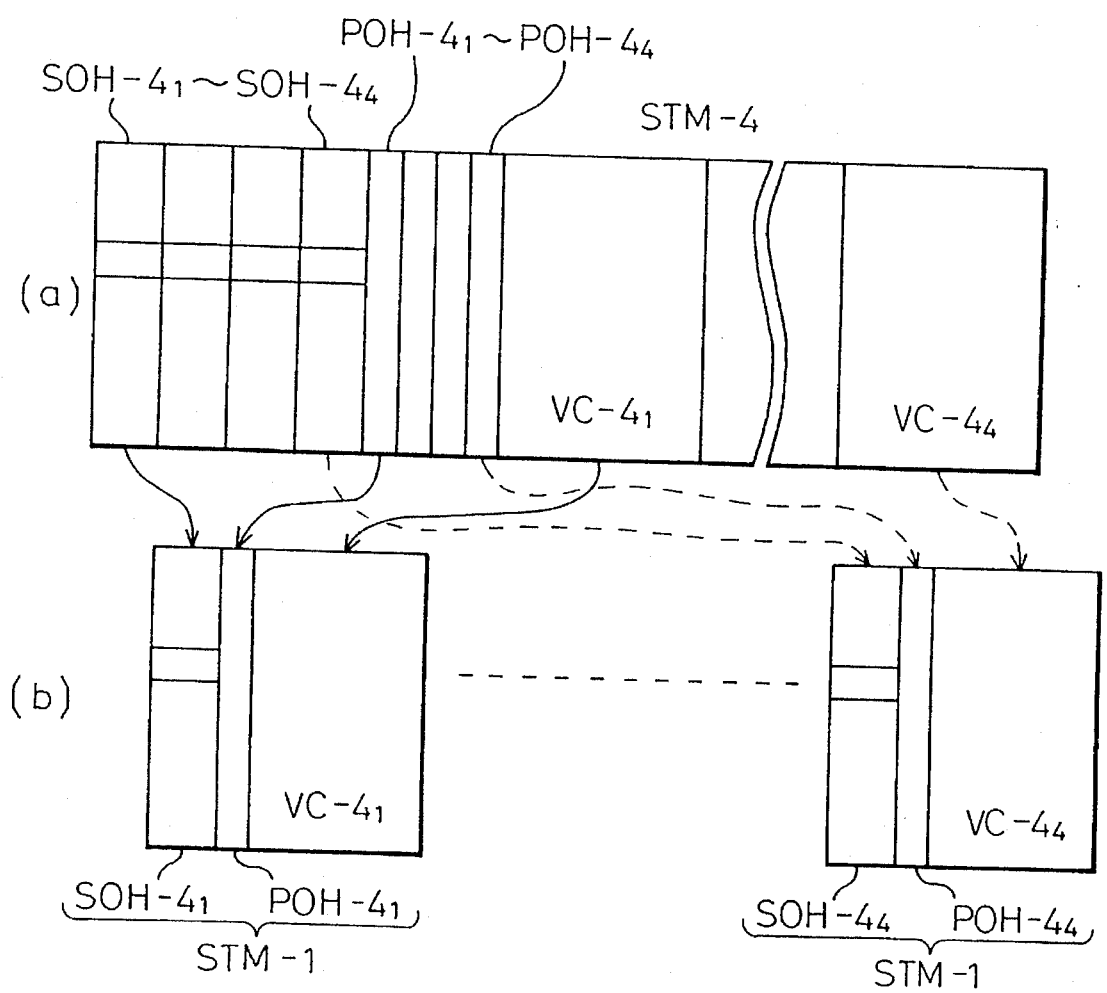
FIG. 12 is a conceptual view of the relationship between synchronous transport modules STM-4 and STM-1.

Several virtual containers VC-4 may be collected to form a higher rate path of a synchronous transport module STM-n. FIG. 12(a) illustrates this STM-4. That is, this consists of the series of the virtual containers VC-4$_1$ to VC-4$_4$ and, disposed before them, the path overheads POH-4$_1$ to POH-4$_4$ and the section overheads SOH-4$_1$ to SOH-4$_4$ corresponding to the virtual containers VC-4.

Figure 17:
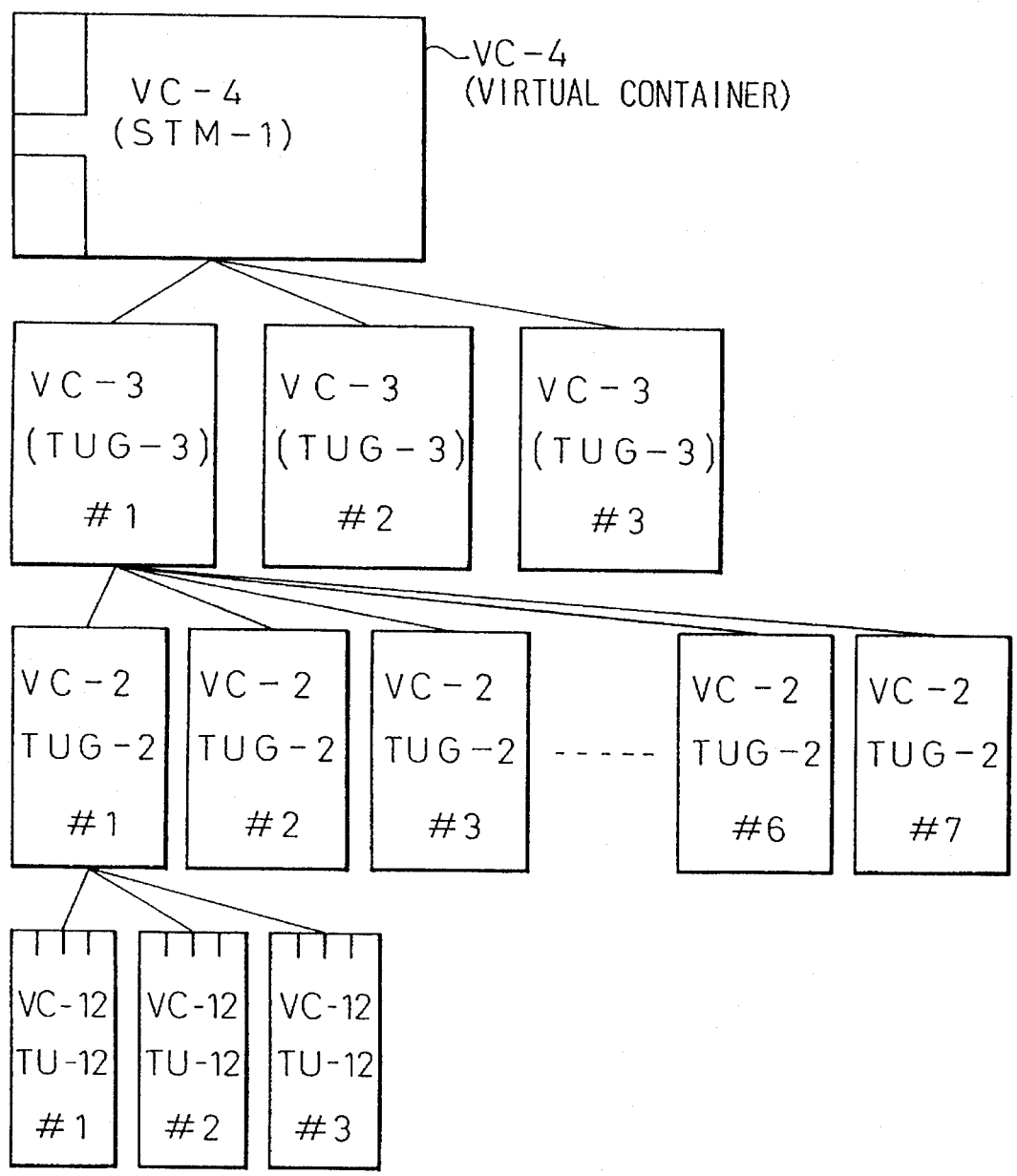
FIG. 17 is a conceptual view of a hierarchical configuration.

A virtual container VC-4, as shown in FIG. 17, may be mapped hierarchically by further smaller unit virtual containers VC-m (hereinafter sometimes referred to as lower rate paths).

Figure 14:
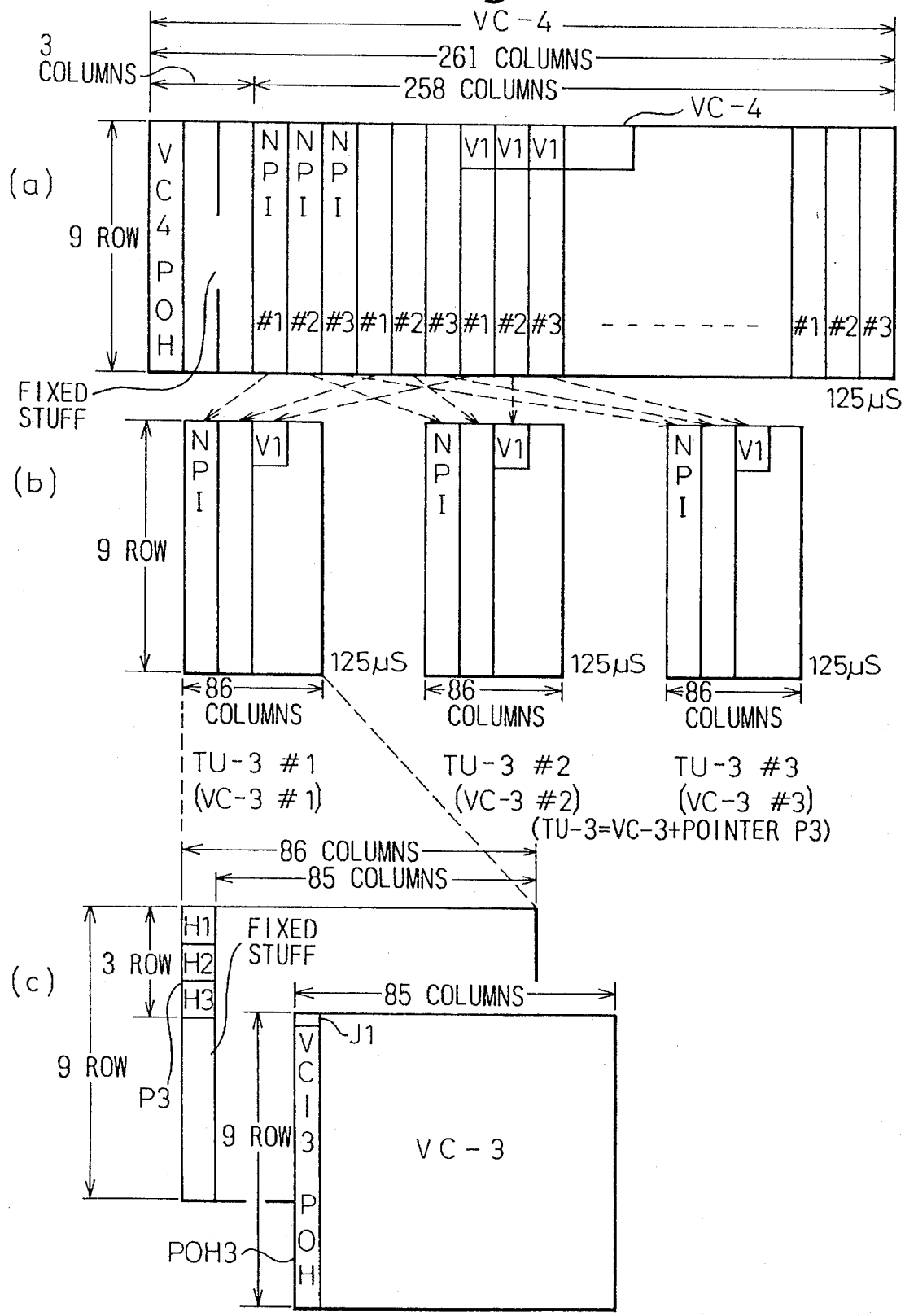
FIG. 14 is a conceptual view of a virtual container VC-4 and a virtual container VC-3.

That is, as shown in FIG. 14, a virtual container VC-4 may further contain three tributary units TU-3 each comprised of a virtual container VC-3 and a pointer P3.

The relationship between the virtual container VC-4 and the tributary units TU-3 is as shown in FIGS. 14(a) and (b). That is, a tributary unit TU-3 is constituted by the group of every third column of the columns constituting the virtual container VC-4.

In this case, the pointer P3, as shown in FIG. 14(c), is placed at the top portion of the first column and the position of the header byte of the virtual container VC-3, that is, the connecting destination byte J1, is inserted. When the virtual container VC-3 is further comprised of lower layer virtual containers VC-m, as shown by the null pointer indication (NPI) in FIG. 14, the pointer P3 is not used (since synchronization is established between the tributary unit TU-3 and the lower rate path, there is no need to indicate the position of the lower layer virtual container VC-m). Further, the path overhead POH-3 of the virtual container VC-3 is placed in accordance with Table 1 at the header portion of the virtual container VC-3.

The virtual container VC-3 is further comprised of seven tributary units TU-2 each comprised of a lower layer virtual container VC-2 and its pointer P2.

As shown in FIGS. 15(a) and (b), a tributary unit TU-2 may be formed by collecting groups of 12 columns interspaced by five columns from the columns constituting the virtual container VC-3. Further, a virtual container VC-2, as shown in FIG. 15(c), is formed by placing four tributary units TU-2 successively in the row direction and removing the header bytes V$_1$ to V$_4$ of the tributary units TU-2.

In this relationship, use is made of the header bytes V$_1$ and V$_2$ among the header bytes V$_1$ to V$_4$ of a tributary unit TU-2 as the pointer P2. There, the position of the header byte V$_5$ of the virtual container VC-2 is written. The path overhead POH-2 of the virtual container VC-2 is placed in the header byte V$_5$ in accordance with Table 1. Further, the connecting destination byte J2 (Table 1) is placed at the 104th byte from the header byte V$_5$.

As shown in FIGS. 16(a), (b), and (c), a tributary unit TU-2 may include lower layer tributary units TU-12. A tributary unit TU-12 is formed by collecting groups of four columns interspaced by two columns from the columns constituting the tributary unit TU-2. Further, by placing four tributary units TU-12 successively in the row direction and removing the header bytes V$_1$ to V$_4$ of the tributary units TU-12 from the successive bytes, a virtual container VC-12 is obtained.

In this relationship, use is made of the header bytes V$_1$ and V$_2$ in the header bytes V$_1$ to V$_4$ of a tributary unit TU-12 as a pointer P12. There, the position of the header byte V$_5$ of the virtual container VC-12 is written.

The path overhead POH-12 of the virtual container VC-12 is placed in the header byte V$_5$ in accordance with the following Table 1, but the connecting destination byte J2 (Table 1) is placed at the 36th byte from the header byte V$_5$.

TABLE 1

| Information | VC-4 | VC-3 | VC-2 | | VC-12 | |
|---|---|---|---|---|---|---|
| Connecting destination | J1 (byte) | J1 (byte) | J2 (byte) | | J2 (byte) | |
| Bit error | B3 (byte) | B3 (byte) | V$_5$ byte | 1–2nd bits | V$_5$ byte | 1–2nd bits |
| Mapping | C2 (byte) | C2 (byte) | | 5–7th bits | | 5–7th bits |
| Error frequency | G1 (byte) | G1 (byte) | | 3–8th bits | | 3–8th bits |

In the above Table 1, the connecting destination byte J1, as explained above, indicates the header position of the virtual container VC-4 (VC-3) and carries the connecting destination information of the virtual container VC-4 (VC-3). In the virtual container VC-2 (VC-12), the corresponding connecting destination information J2 is placed at a predetermined position from the header byte V$_5$.

The bit error byte B3 is bit error information of data carried in the virtual container VC-4 (VC-4). In the virtual container VC-2 (VC-12), the corresponding bit error information is placed at the first and second bits of the header byte V$_5$.

The mapping byte C2 is mapping information showing the state of mapping of the virtual container VC-4 (VC-3). In the virtual container VC-2 (VC-12), the corresponding mapping information is placed at the fifth to seventh bits of the header byte V$_5$.

The error frequency byte G1 shows the state of occurrence of errors in the virtual container VC-4 (VC-3). In the first to fourth bits, a flag showing the number of errors at the time of reception at the preceding equipment is established and at the fifth bit a flag showing if error has occurred from the reception at the preceding equipment to the transmission from the preceding equipment is established. The error frequency information is placed at the third and eighth bits of the virtual container VC-2 (VC-12). The third bit shows only if error has occurred up until the preceding equipment. It does not show the number of errors as with the above error frequency byte G1.

Figure 18:
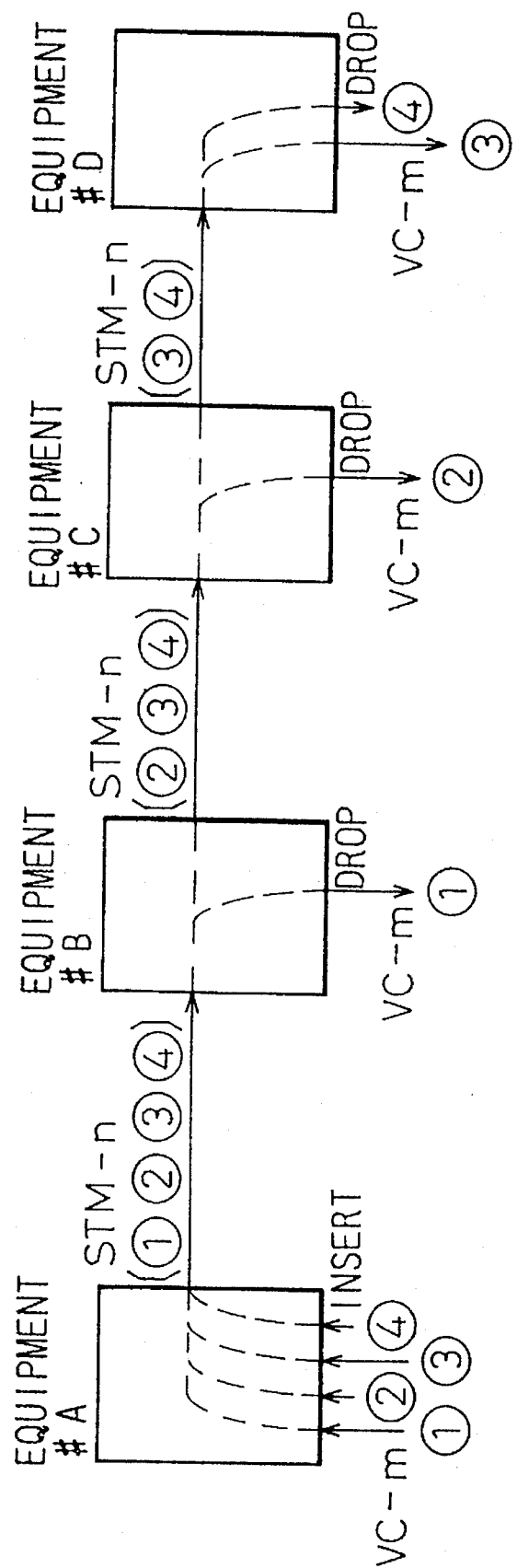
FIG. 18 is a conceptual view of the state of transmission by a synchronous transport module.

FIG. 18 shows the state of transmission of a synchronous transport module STM-n of such a configuration.

Figure 19:
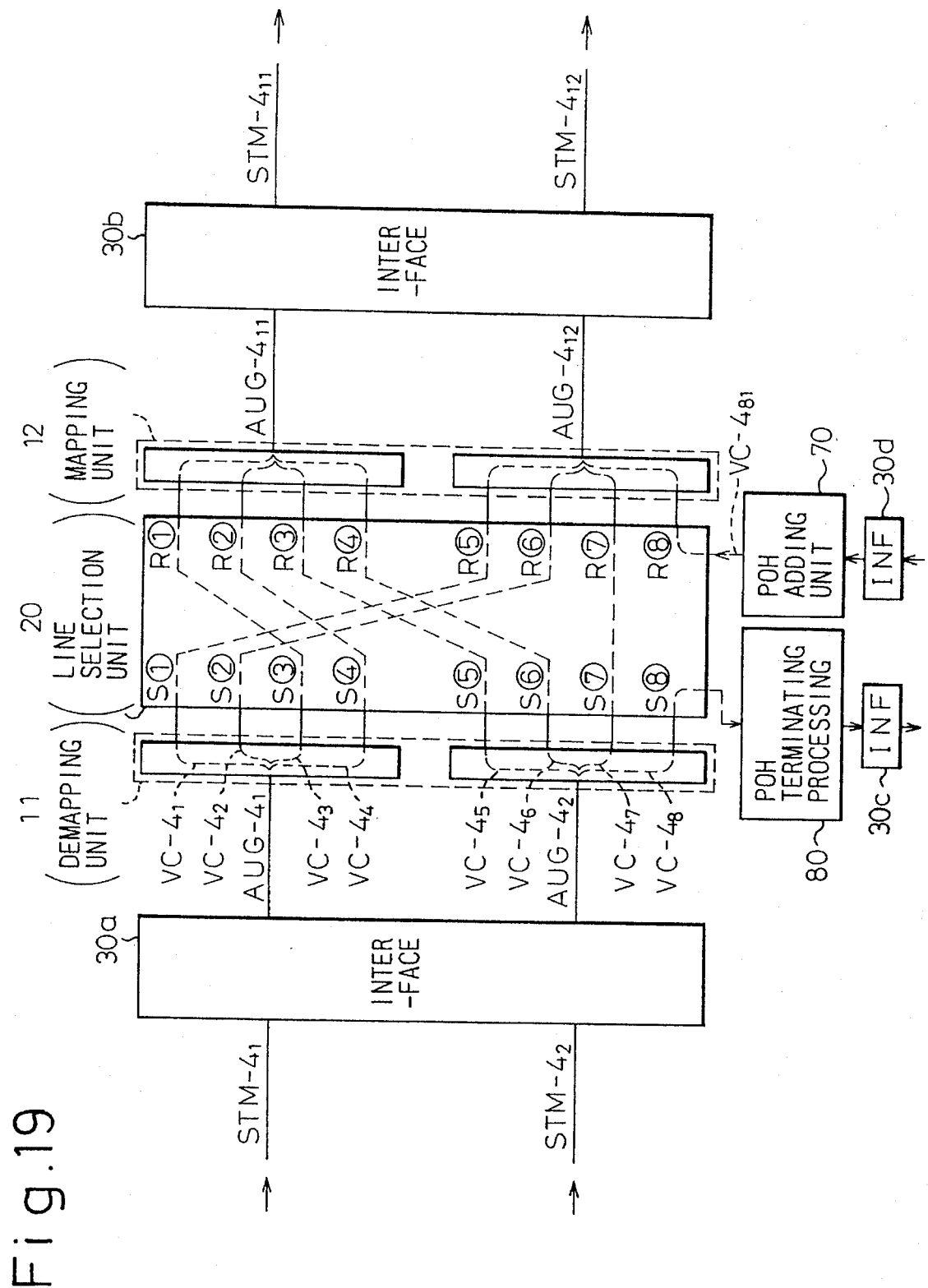
FIG. 19 is a conceptual view of a conventional SDH system.
Figure 20:
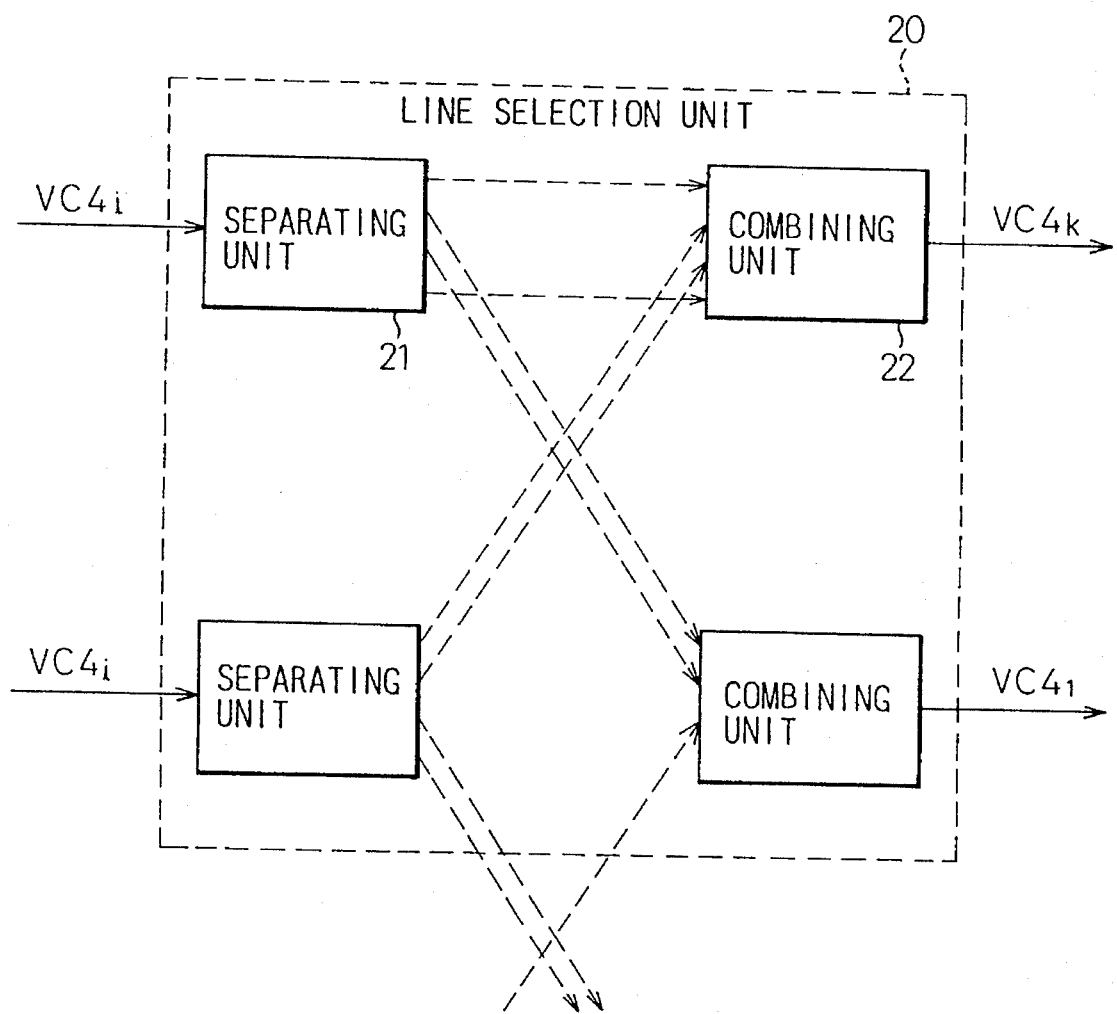
FIG. 20 is a conceptual view of a line selection means.

The synchronous transport module STM-n incorporating the different layers of virtual containers VC-m<i>, <2>, <3>, and <4> is sent by the sending equipment A and drops at the equipment B, C, and D the virtual containers VC-m with connecting destinations corresponding to the same in accordance with the settings of a line selection means 20 (FIGS. 19 and 20).

FIG. 19 is a block diagram showing the concept of a conventional SDH system.

Consider the case of input to the interface (INF) 30a of an STM-4$_1$ including the four virtual containers VC-4$_1$ to VC-4$_4$ and an STM-4$_2$ including the four virtual containers VC-4$_5$ to VC-4$_8$. At the interface 30a, the AU groups AUG-41 and AUG-4$_2$, from which the RSOHs and MSOHs in the section overheads of the STM-4$_1$ and STM-4$_2$ have been removed (in FIG. 12, the units from which the RSOH and MSOH of the four section overheads SOH have been removed), are extracted and input to the demapping means 11. Here, the virtual containers VC-4$_1$ to VC-4$_4$ and VC-4$_5$ to VC-4$_8$ having the pointers P4$_1$ to P4$_4$ and P4$_5$ to P4$_8$, respectively, are extracted from the AU groups AUG-4$_1$ and AUG-$4_2$ (a virtual container with a pointer is an administrative unit AU, but for simplification, use is made not of the AU, but of the virtual container VC for the explanation in some cases) and the virtual containers VC-$4_1$ to VC-$4_4$ and VC-$4_5$ to VC-$4_8$ are input to the line selection means 20.

At the line selection means 20, the connections between the input terminals S<i> to S<8> and the output terminals R<i> to R<8> are set. For example, the virtual container VC-$4_1$ input from the input terminal S<i> is first output from the output terminal R<5>.

At the opposing side of the demapping means, a mapping means 12 is provided. A synchronous transport module STM-4 demapped in this way is once again mapped and output. For example, in the example of FIG. 19, the virtual containers VC-$4_1$, VC-$4_2$, VC-$4_7$ and the virtual container VC-$4_{81}$ added at that equipment are newly mapped to form the administrative unit group AUG-$4_{12}$ or are newly mapped in the virtual containers VC-$4_3$, VC-$4_4$, VC-$4_5$, and VC-$4_6$ to form the administrative unit group AUG-$4_{11}$.

The administrative unit group AUG-$4_{11}$ and the administrative unit group AUG-$4_{12}$ have added to their section overheads SOH the RSOH and MSOH at the interface 30b and are output as the synchronous transport modules STM-$4_{11}$ and STM-$4_{12}$.

The VC-$4_8$ among the virtual containers VC-$4_1$ to VC-$4_8$ is terminated at the equipment. That is, the path overhead POH of the virtual container VC-$4_8$ is processed at the terminating processing means 80 and output through the interface (INF) 30c. Further, it is possible to add a new virtual container VC-m here. That is, the path overhead POH is added to the VC-$4_{81}$ input through the interface 30d by the path overhead adding means 70 and assembled with the administrative unit group AUG-$4_{12}$ by the mapping means 12 for output.

When the virtual container VC-4 obtained by demapping at the demapping means 11 further includes lower layer virtual containers VC-m, such as VC-3, it is possible to extract and terminate the virtual containers VC-m by the line selection means or transfer them to another high rate path.

That is, as shown in FIG. 20, a container separating means 21 is provided in the line selection means 20 to separate the lower layer virtual containers VC-m from the virtual container VC-4, while a container combining means 22 is provided to combine lower layer virtual containers VC-m separated by the above container separating means 21.

Of course, the lower layer virtual containers VC-3, VC-2, and VC-12 obtained by demapping can be terminated at the equipment by terminating processing of the path overhead in the same way as the virtual container VC-4.

The configuration of the container separating means 21 and the configuration of the combining means 22 are not related to the basic nature of the present invention, so explanations of the same will be omitted here. Further, configurations similar to those of the container separating means 21 and terminating processing means 80 will be explained later to the extent necessary for explaining the present invention.

In a conventional SDH transmission system, as explained earlier, the path overhead POH can only be detected by the SDH equipment terminating the path. When an error occurs during transmission over a certain path, however, it is not possible to judge at what stage (at what end office) the error occurred and consequently time is taken for ascertaining the source of the error and recovering the same. Accordingly, in recent years, even the CCITT has established a new protocol so as to enable monitoring of the control bytes or control bits making up a path overhead during transmission, but no equipment satisfying that protocol has yet been developed.

The present invention was made in consideration of the above situation and provides an SDH transmission system which enables detection of the desired path overhead of a path and a check of its content not only by the terminating equipment of the path, but also the one or more equipment passed through.

Figure 1:
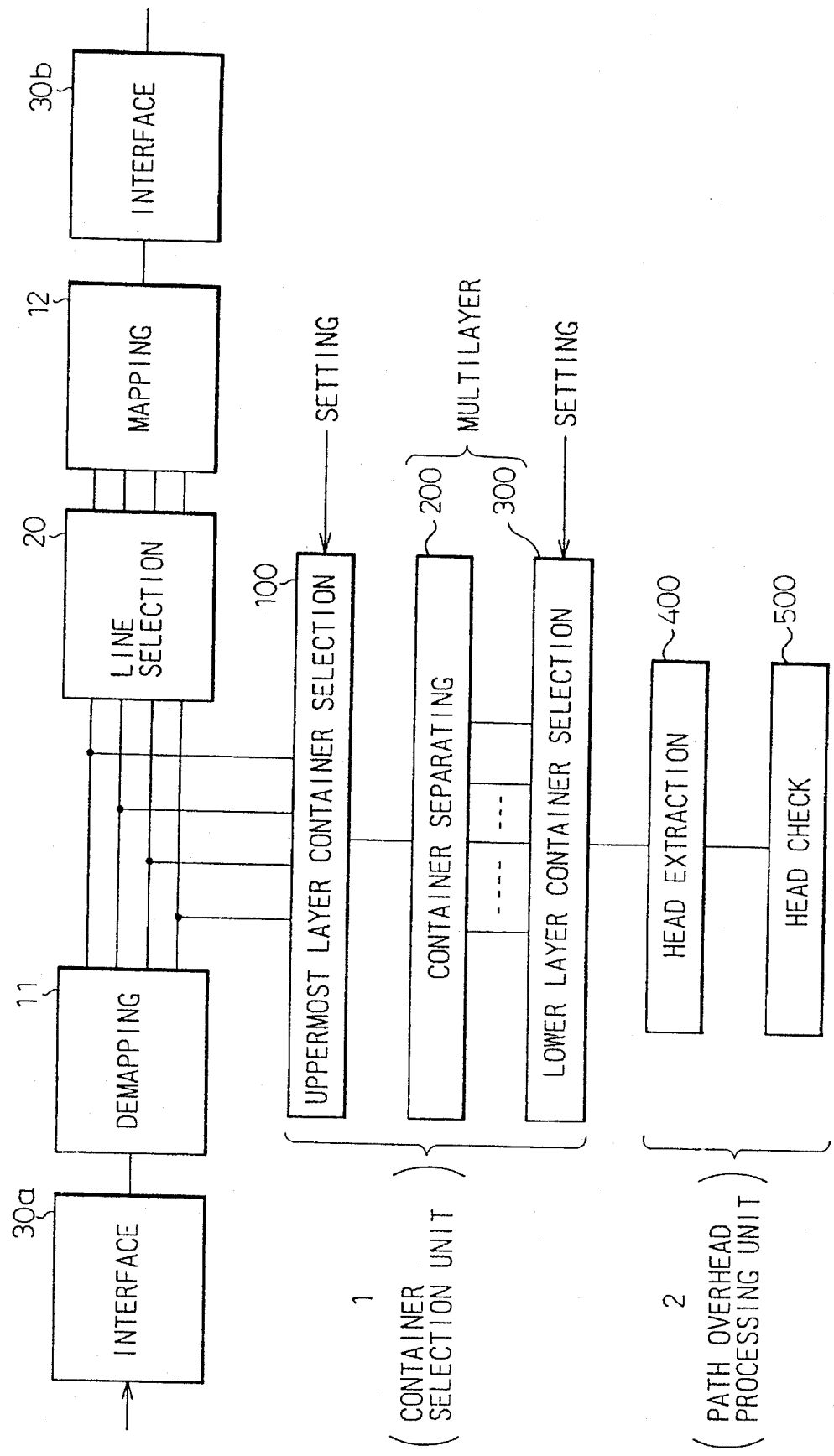
FIG. 1 is a view of the principle of the present invention.

The present invention uses the following means for achieving the above object. That is, as shown in FIG. 1, the present invention provides an SDH transmission system for digital transmission using as a unit of transmission a synchronous transport module STM-n hierarchically mapped by virtual containers VC-m, wherein provision is made of a container selection means 1 for selectively extracting a specific virtual container VC-m of a particular layer from among the uppermost layer virtual containers VC-4 obtained from a demapping means 11 constituting a part of the SDH transmission system and a path overhead processing means 2 for processing the path overhead of the specific virtual container VC-m obtained from the above container selection means 1.

The container selection means 1 is provided with an uppermost layer container selection means 100 for selectively extracting a desired virtual container VC-4 from among the plurality of uppermost layer virtual containers VC-4, a container separating means 200 for separating the lower layer virtual containers VC-m from an upper layer virtual container VC-m, and a lower layer container selection means 300 for selectively extracting the desired virtual container VC-m from among the virtual containers VC-m obtained from the container separating means 200.

Further, the path overhead processing means 2 is provided with a head extraction means 400 for extracting the path overhead POH-m from the extracted virtual container VC-m and a head check means 500 for checking and displaying the state of a specific information byte in the path overhead extracted from the head extraction means 400.

In the above configuration, when what is processed by the path overhead processing means 2 is the uppermost layer virtual container VC-4, the above container separating means 200 and lower layer container selection means 300 may be omitted.

When what is processed by the path overhead processing means 2 is the virtual container VC-3, provision is made of one set of the above container separating means 200 and lower layer container selection means 300.

When what is processed by the path overhead processing means 2 is the virtual container VC-2, two sets of the above container separating means 200 and the lower layer container selection means 300 are combined in multiple layers.

When what is processed by the path overhead processing means 2 is the virtual container VC-12, three sets of the above container separating means 200 and the lower layer container selection means 300 are combined in multiple layers.

Figure 2:
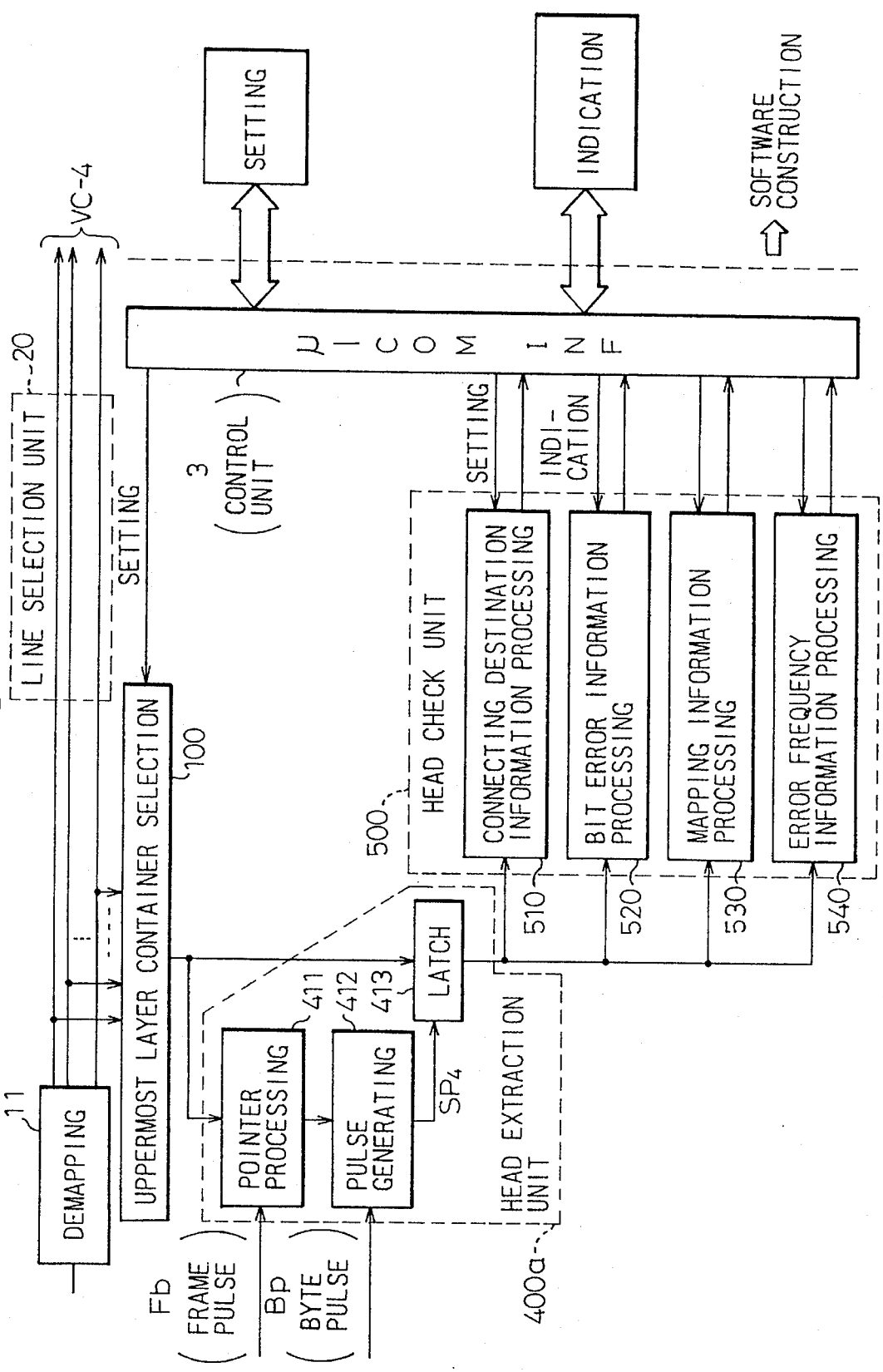
FIG. 2 is a block diagram of an embodiment of the present invention.

The virtual containers VC-m to be selected by the uppermost layer container selection means 100 and the lower layer container selection means 300 may be set by a control means 3 (FIG. 2).

The above head check means 500 may be comprised of a connecting destination information processing unit 510 for checking the connecting destination byte J1 showing the connecting destination of the virtual container VC-m, a bit error processing unit 520, a mapping information processing unit 530, and an error frequency information processing unit 540.

The connecting destination information processing unit 510 is configured to compare the results of computation of the CRC of the received connecting destination information and the expected value of the CRC carried in the received data. Further, it may be configured to make a direct comparison of the received connecting destination information and the expected value of the connecting destination information.

The bit error processing unit 520 is configured to compare the results of the computation of the parity of the received data and the bit error information carried in the received data to obtain the number of times of occurrence of bit error in a predetermined time frame.

The bit frequency information processing unit 540 also counts the number of times of occurrence of the error in a predetermined time frame.

If a specific virtual container VC-m of a certain layer is set in the container selection means 1 by the control means 3, the container selection means 1 extracts the set virtual container VC-m.

The path overhead POH-m of the thus extracted virtual container VC-m is extracted and checked at the path overhead processing means 2.

If a specific virtual container VC-4 is set by the control means 3 such as a CPU in the uppermost layer container selection means 100, it is possible to obtain only the virtual container VC-4 to be checked.

The thus obtained virtual container VC-4 is separated into the further lower layer virtual containers VC-m by the container separating means 200 and the results input to the next lower level container selection means 300. At this lower level container selection means 300, like with the uppermost layer container selection means 100, it is possible to extract only the desired virtual container VC-m set by the control means 3, such as a CPU.

The container separating means 200 and the lower layer container selection means 300 are of multilayer configurations corresponding to the hierarchical configuration of the virtual container VC-4. Due to this, it is possible to extract the lowermost layer virtual containers VC-m constituting the virtual container VC-4 extracted by the uppermost layer container selection means 100.

When the desired virtual container VC-m is only an uppermost layer virtual container $VC_4$, the desired virtual container $VC_4$ can be obtained by just the uppermost layer container selection means 100 without going through the container separating means 200 and the lower layer container selection means 300.

On the other hand, when the desired virtual container VC-m is a lower layer virtual container VC-3, one set of the container separating means 200 and the lower layer container selection means 300 is set up.

Further, when the desired virtual container VC-m is a lower layer virtual container VC-2, two sets of the container separating means 200 and the lower layer container selection means 300 are set up in multiple layers.

Further, when the desired virtual container VC-m is a lower layer virtual container VC-12, three sets of the container separating means 200 and the lower layer container selection means 300 are set up in multiple layers.

The virtual container VC-m to be selected by the uppermost layer container selection means 100 or the lower layer container selection means 100 is set by the control means 3.

Accordingly, the operator can extract just the virtual container VC-m in which the fault occurred and process it by the path overhead processing means 2 explained below.

The path overhead processing means 2 extracts and checks the path overhead POH-m from the virtual container VC-m extracted as explained above. This path overhead processing means 2 checks the connecting destination information, the bit error information, the mapping information, and the error frequency information.

The functions of the path overhead processing means 2 resemble the conventional terminating processing functions, but in the past only information indicative of the header of the frame had been placed in the area corresponding to the connecting destination information J1 of the present invention, so there are differences in that it was not possible to check the connecting destination and in that the number of times of occurrence of error in a predetermined time frame was determined based on the error frequency information.

FIG. 2 is a block diagram of an embodiment of the present invention for checking a virtual container VC-4.

As explained above, a virtual container VC-4 is output to each channel of the output of a demapping means 11 (input of line selection means 20). The virtual container VC-4 is input to the uppermost layer container selection means 100. The connecting destination of the virtual container VC-4 transferred to the channels is determined in advance at the design stage.

Figure 3:
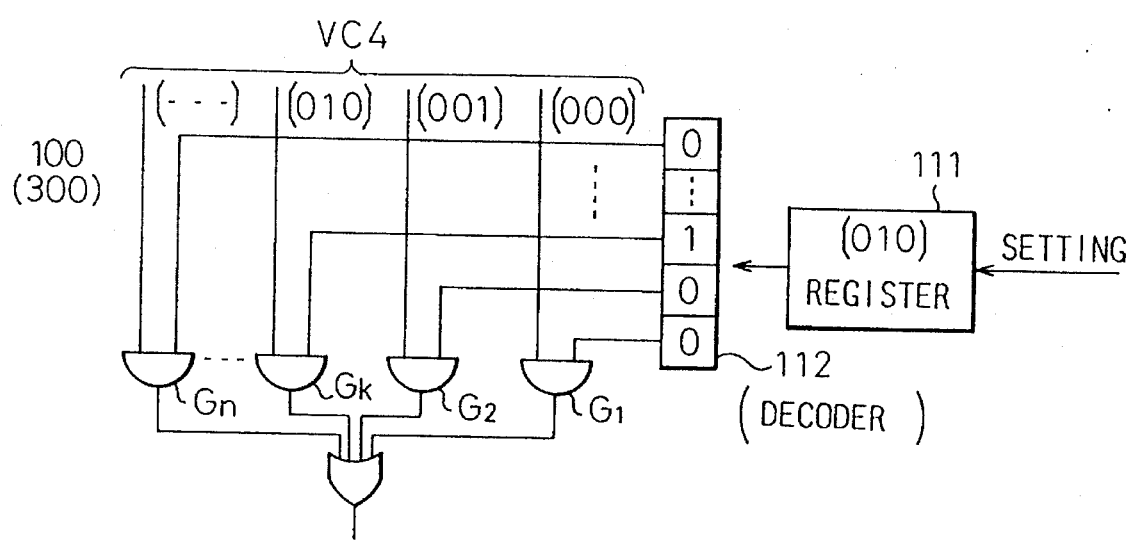
FIG. 3 is a block diagram of the uppermost layer (lower layer) container selection means.

Therefore, as shown in FIG. 3, in the uppermost layer container selection means 100, when the register 111 is set with a number of a channel corresponding to the desired virtual container VC-4, the corresponding bit in the decoder 112 becomes "1" and the corresponding gate $G_k$ in the gates $G_l$ to $G_n$ is opened.

Accordingly, the desired virtual container VC-4 is input to the head extraction means 400a (FIG. 2) constituting part of the path overhead processing means 2, the path overhead POH-4 is extracted, then the thus extracted path overhead POH-4 is processed by the head check means 500.

That is, the thus extracted virtual container VC-4 is successively input to the pointer processing means 411 and the latch means 413 constituting part of the head extraction means 400. A frame pulse Fp is output from a not shown timing circuit to the pointer processing means 411 in accordance with the position of the header of the synchronous transport module STM-1 in which the virtual container VC-4 is accommodated. The pointer processing means 411 receives as input the frame pulse Fp and reads the content of the pointer P4 (refer to FIG. 3) from the header byte to the ninth byte in the third row.

The pointer P4 has written in it the position from the pointer P4 of the connecting destination byte J1 indicating the header byte of the virtual container VC-4, as mentioned above (position where byte right after ninth byte of pointer is counted as first). As explained above, the position of the connecting destination byte J1 read by the pointer processing means 411 is initially set in the pulse generating means 412. The pulse generating means 112 may be comprised by a counter.

The pulse generating means 412 counts the byte pulse Bp synchronized by the length of 1 byte and outputs the pulse Sp4 for entering the next latch means 413 at the position of the path overhead POH-4 of the virtual container VC-4 (count corresponding to path overhead pOH).

Accordingly, if the position of the connecting destination byte J1 is initially set in this way, then the first fetch pulse Sp4 will be output at the timing corresponding to the position of the connecting destination byte J1, then the fetch pulse Sp4 will be successively output at the positions of the bit error byte B3, the mapping byte C2, and the error frequency byte G1 constituting the path overhead P4. Due to this, the connecting destination byte J1, bit error byte B3, mapping byte C2, and error byte G1 constituting the path overhead POH-4 are successively latched at the latch means 413.

The control bytes of the path overhead POH-4 latched in this way are input to the head check means 500 and processed by the respectively corresponding information processing units, explained below.

Figure 4A:
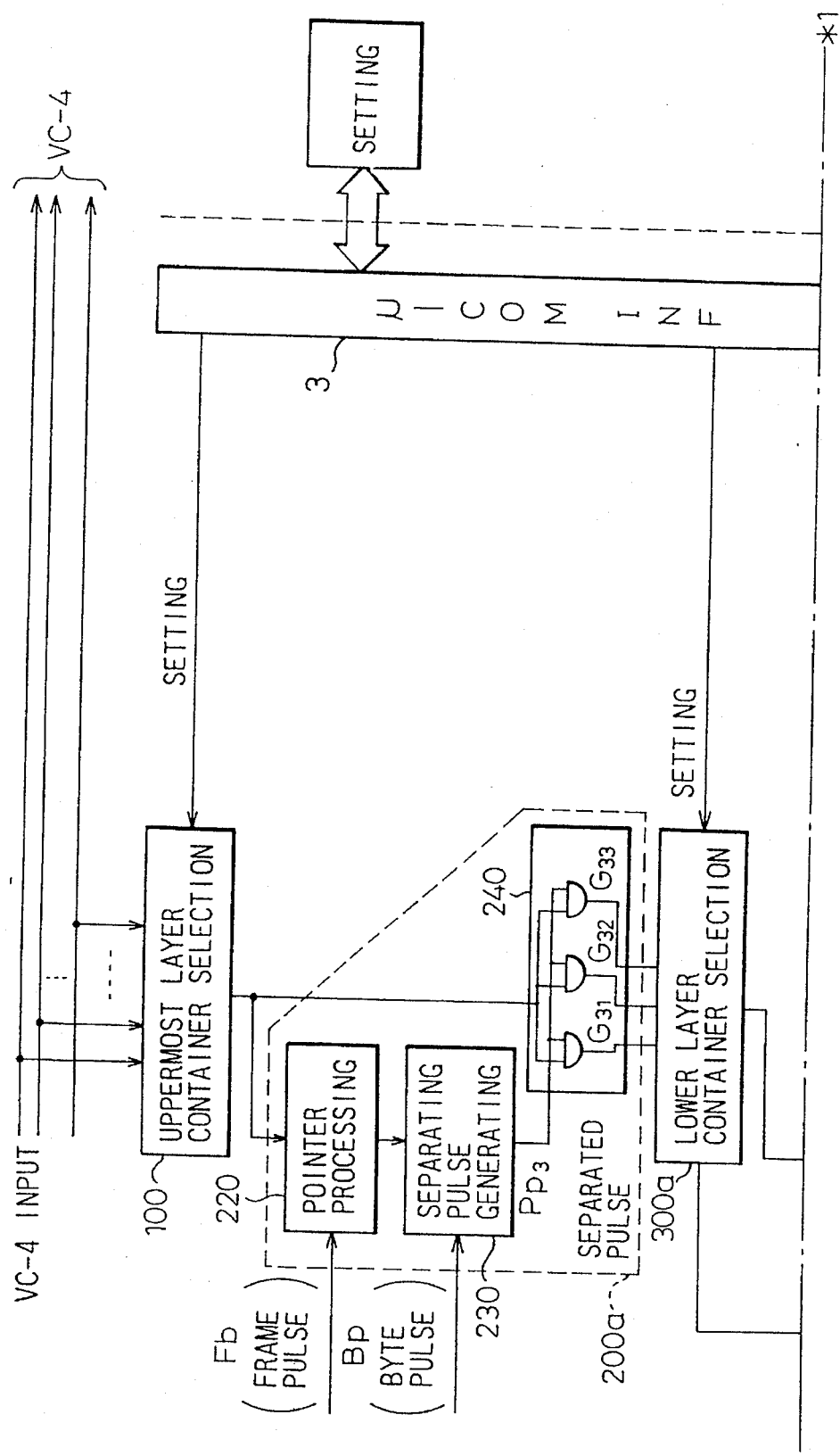

FIGS. 4A and 4B are block diagrams of an embodiment of the present invention for monitoring a virtual container VC-3. The configuration of the uppermost layer container selection means 100 is exactly the same as the example of the virtual container VC-4 explained above.

The virtual container VC-4 extracted by the above uppermost layer container selection means 100 is input to the container separating means 200a where it is separated into further lower layer virtual containers VC-3. The configuration itself of the container separating means 200a is the same as the container separating means 21 used for the line selection means 20.

That is, the virtual container VC-4 obtained from the uppermost layer container selection means 100 is input to the pointer processing means 220, where in the same way as the above pointer processing means 411, the position of the connecting destination byte J1 is extracted and set in the separating pulse generating means 230. By this, the separating pulse generating means 230 counts the byte pulses Bp from the position of the connecting destination byte J1 and generates a separating pulse Pp3 at a predetermined timing.

The separating pulse Pp3 is input to the gate means. The gate $G_{31}$ corresponding to the virtual container VC-3#1 (TU-3#1) is opened at the third, sixth, ninth ... bytes from the position of the connecting destination byte J1, the gate $G_{32}$ corresponding to the virtual container VC-3#2 (TU-3#2) is opened at the fourth, sixth, 10th ... bytes, and the gate $G_{33}$ corresponding to the virtual container VC-3#3 (TU-3#3) is opened at the fifth, seventh, 11th ... bytes (see FIG. 14).

The three virtual containers VC-3 separated from the virtual container VC-4 in this way are input to the lower layer container extraction means 300a. The configuration of the lower layer container extraction means 300a is the same as the configuration of the uppermost layer container selection means 100, but since there are three virtual container VC-3 to be selected, there are also three gates.

The desired virtual container VC-3 extracted at the lower layer container extraction means 100a is input to the head extraction means 400b. The head extraction means 400b has the same function as the head extraction means 400a applied to the virtual container VC-4 mentioned above.

That is, the pointer P3 of the virtual container VC-3 (tributary unit TU-3), as shown in FIG. 14(c), is at the header portion of the virtual container VC-3, so the pointer processing means 421 detects the pointer P3 and sets that value in the pulse generating means 422. The pulse generating means 422 counts the byte pulses up to the value set as above, outputs the first pulse Sp3, and then successively outputs the fetch pulses Sp3 in accordance with the path overhead POH-3 of the virtual container VC-3.

Receiving the fetch pulse Sp3, the latch means 423 latches the bytes constituting the path overhead POH-3 of the virtual container VC-3. The latched path overhead POH-3 is input to the next head check means 500 where it is processed as explained later.

Figure 5B:
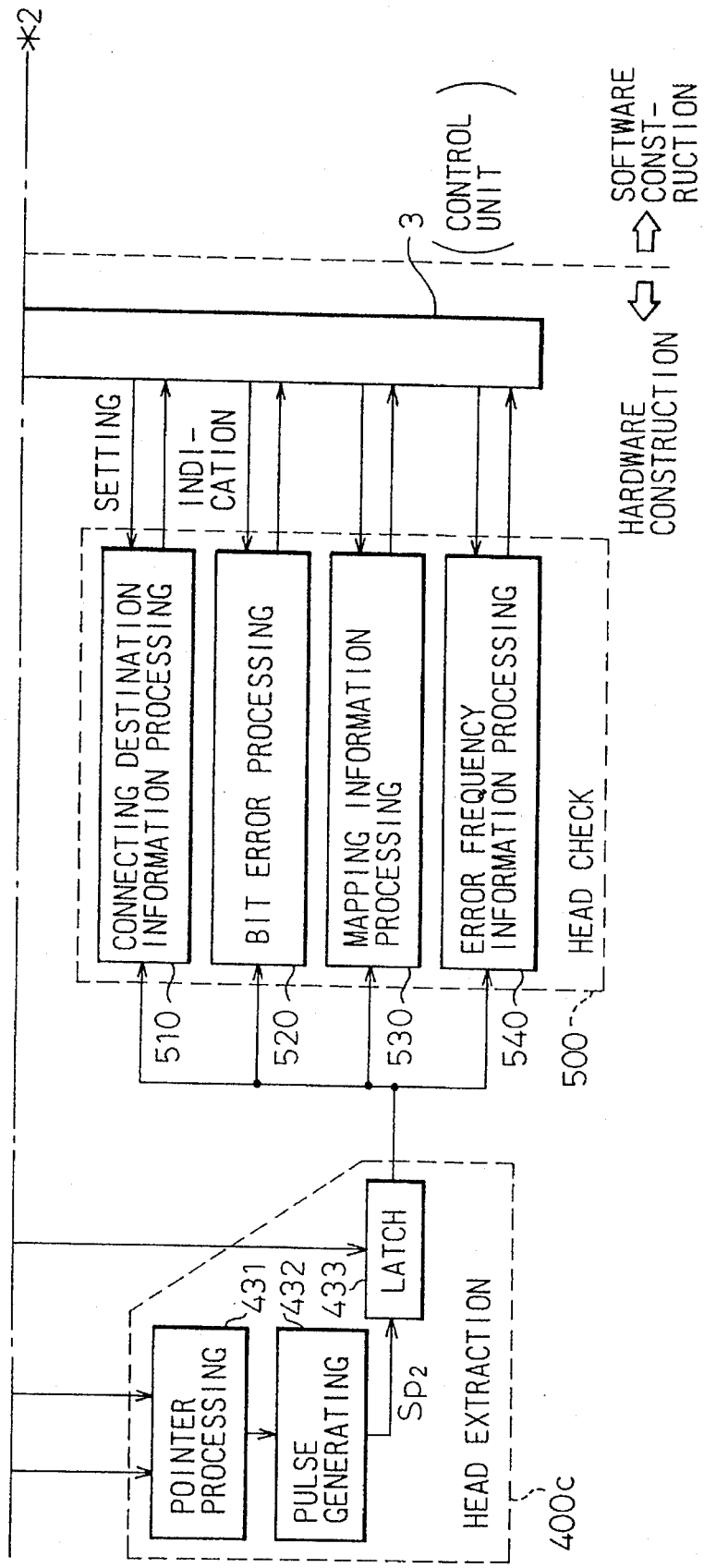

FIGS. 5A and 5B are block diagrams of an embodiment of the present invention relating to the detection of the path overhead of the virtual container VC-2.

The configuration up until the extraction of the virtual container VC-3 is exactly the same as the example shown in FIG. 4.

The desired virtual container VC-3 obtained from the lower layer container extraction means 300a is input to the gates $G_{21}$ to $G_{27}$ constituting the container separating means 200b. The gates $G_{21}$ to $G_{27}$ receive as input the separating pulses Pp2 obtained from the separating pulse generating means 23. The gates are successively opened in accordance with the sequence shown in FIG. 15, for example, the gate $G_{21}$ corresponding to the tributary unit TU-2#1 is opened at the count 3, 10, 17 ... from the connecting destination byte J1 and the gate $G_{22}$ corresponding to the tributary unit TU-2#2 is opened at the count 4, 11, 18. ..

The thus obtained tributary units TU-2#1 to TU-2#7 are input to the lower layer container extraction means 300b. The configuration of the lower layer container extraction means 300b is exactly the same as the uppermost layer container selection means 100 and the lower layer container extraction means 300a. The virtual container VC-2 (tributary unit TU-2) set by the CPU or other control means 3 is input to the next head extraction means 400c.

As explained with reference to FIG. 16, the pointer P2 of the tributary unit TU-2 is carried at the header bytes $V_1$ and $V_2$ among the header bytes $V_1$ to $V_4$ of the tributary unit TU-2, in which there are four to a set.

Figure 15:
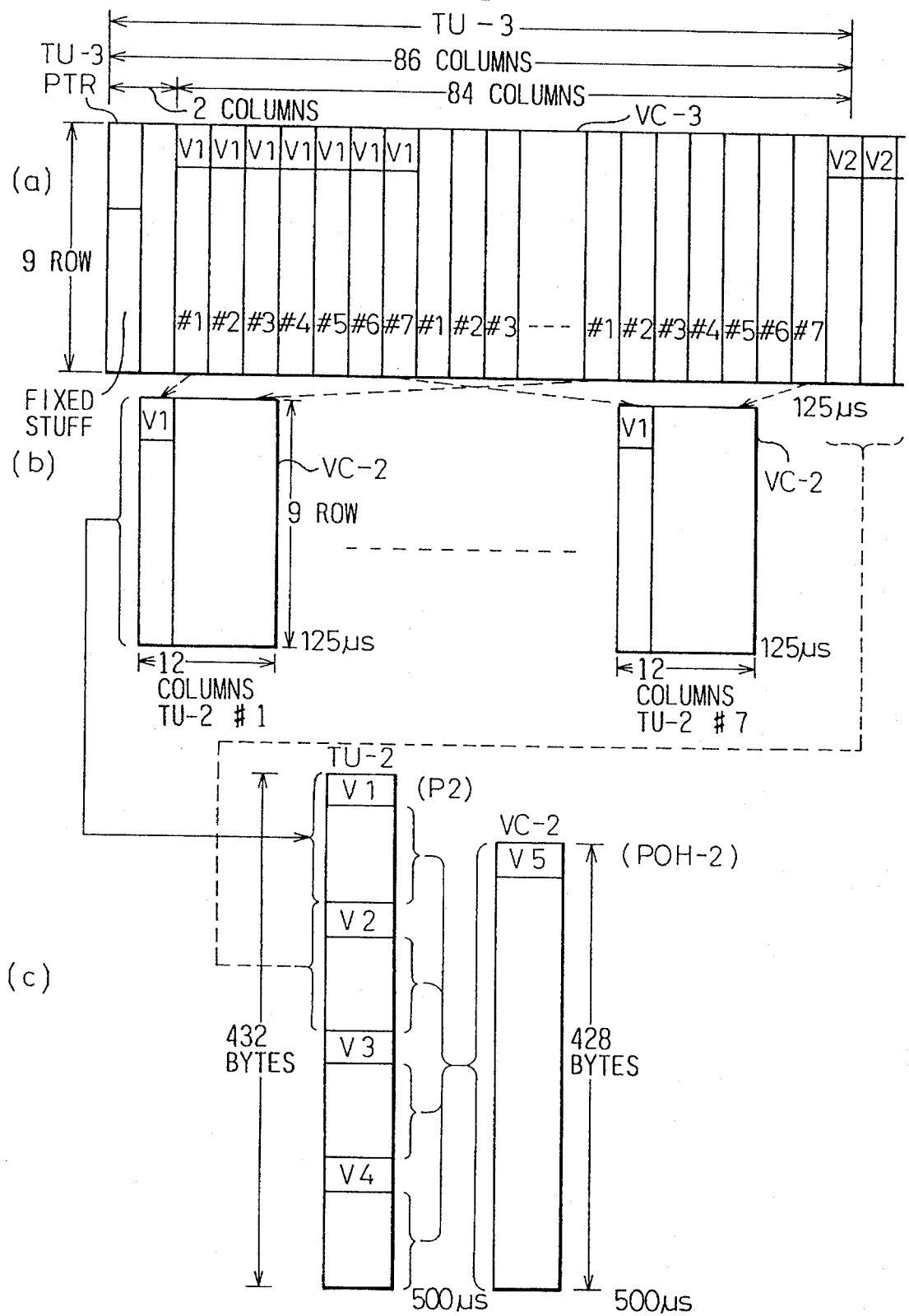
FIG. 15 is a conceptual view of a virtual container VC-3 and a virtual container VC-2.

On the other hand, the separating pulse generating means 230 generates a frame pulse Fp2 corresponding to the length of the tributary unit TU-3 (pulse for each 12 columns as clear from FIG. 15). The pointer processing means 431 extracts the header columns $V_1$ to $V_4$ of the tributary unit TU-2 in synchronization with the frame pulse Fp2. Therefore, it reads the header bytes $V_1$ and $V_2$ in which the pointer P2 is carried and notifies the position of the pointer P2 to the pulse generating means 432.

Due to this, the pulse generating means 432 outputs fetch pulses Sp2 corresponding to the pointer position (position of header byte $V_5$) and the position of the 104th byte from there ($V_5$). The header byte $V_5$ and the connecting destination byte J2 are latched at the latch means 433 and then subjected to head check processing at the next stage.

Figure 6A:
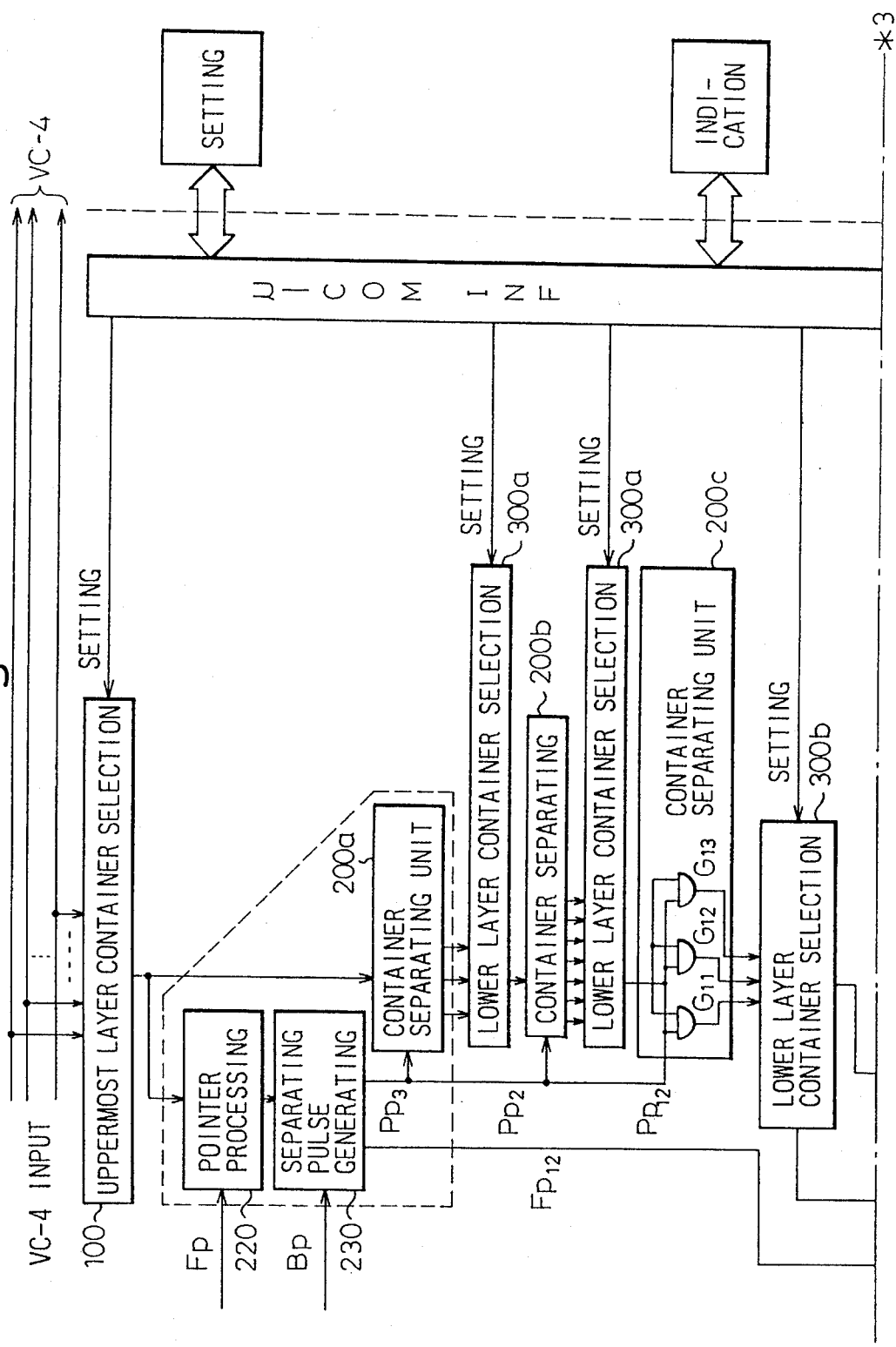
FIGS. 6A and 6B block diagrams of an embodiment of the present invention.
Figure 6B:
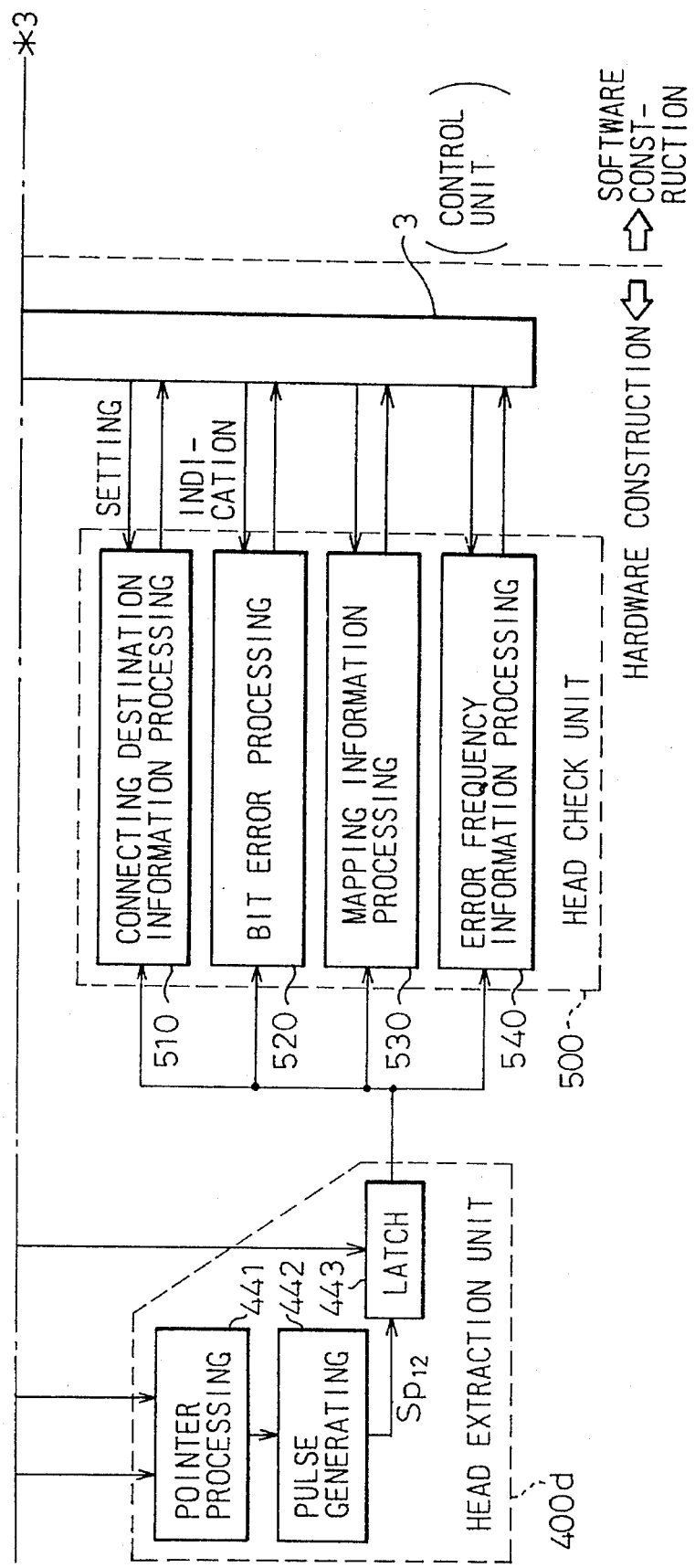

FIGS. 6A and 6B are block diagrams regarding the detection of the path overhead of the virtual container VC-12. The configuration up until the extraction of the virtual container VC-2 is exactly the same as the case shown in FIG. 5.

The desired virtual container VC-2 obtained from the lower layer container selection means 300a is input to the gates $G_{11}$ to $G_{13}$ constituting the container selection means 200. These gates $G_{11}$ to $G_{13}$ receive as input the separating pulses Pp12 obtained from the separating pulse generating means 230. The gates are successively opened in accordance with the sequence shown in FIG. 16, for example, the gate $G_{11}$ corresponding to TU-12#1 is opened at the count 3, 6, 9 ... from the header byte $V_1$ and the gate $G_{12}$ corresponding to the TU-12#2 is opened at the count 4, 7, 10 ... The thus obtained tributary units TU-12#1 to TU-12#3 are input to the lower layer container extraction means 300b. The configuration of the lower layer container extraction means 300b is exactly the same as the lower layer container extraction means 300a and 300b. The virtual container VC-12 (tributary unit TU-12) set here is input to the next head extraction means 400d.

As explained above, the pointer P12 of the tributary unit TU-12 is carried at the header bytes $V_1$ and $V_2$ in the header bytes $V_1$ to $V_4$ of the tributary unit TU-12, four of which constitute a set.

Figure 16:
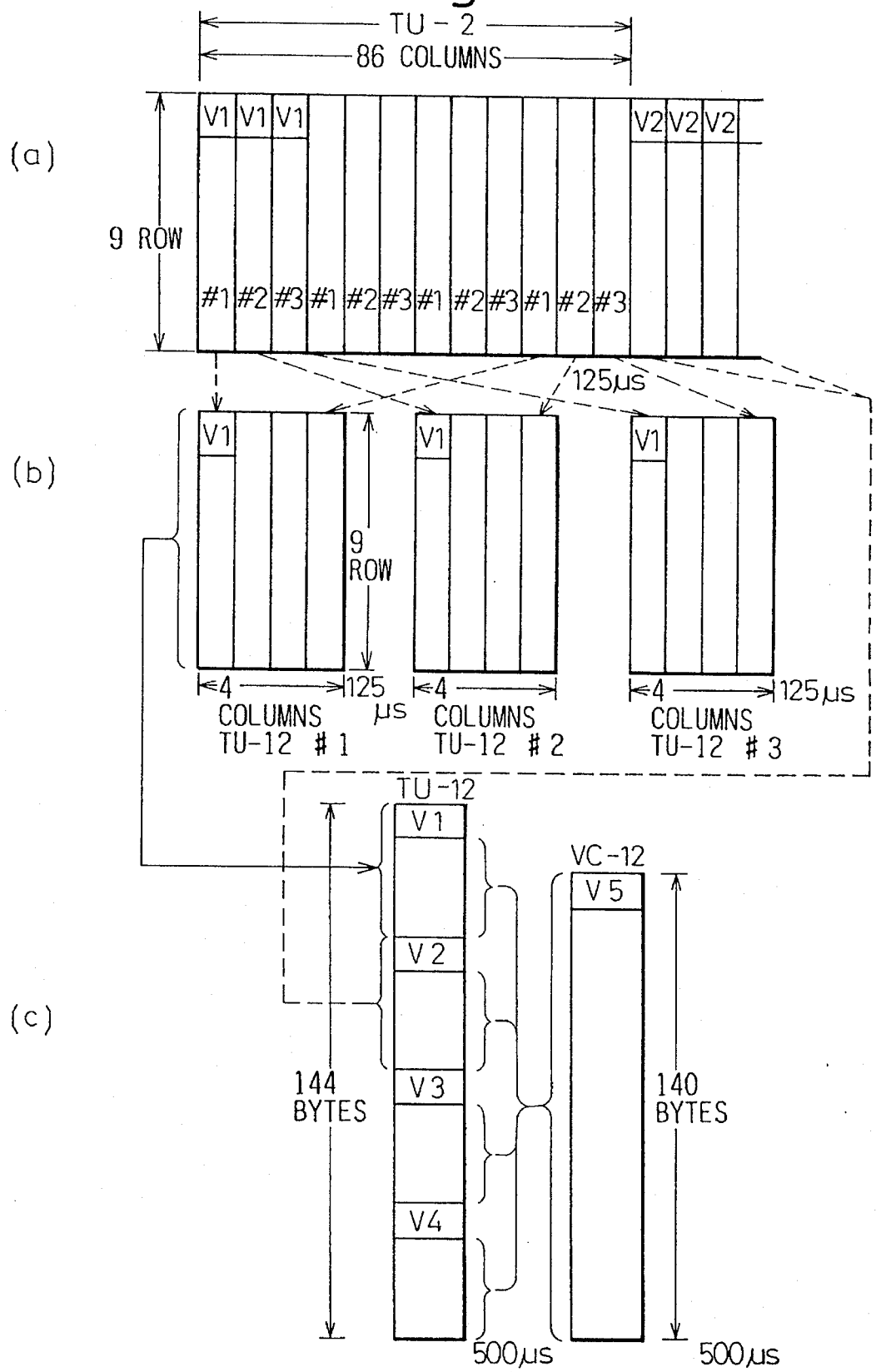
FIG. 16 is a conceptual view of a virtual container VC-3 and a virtual container VC-12.

On the other hand, the separating pulse generating means 230 generates a frame pulse Fp12 corresponding to the length of the tributary unit TU-2 (pulse for each 3 columns as clear from FIG. 16). The pointer processing means 441 extracts the header columns $V_1$ to $V_4$ of each tributary unit TU-2 by the frame pulse Fp12. Therefore, it reads the header bytes $V_1$ and $V_2$ in which the pointer P12 is carried and notifies the position of the pointer P12 to the pulse generating means 442.

Due to this, the pulse generating means 442 outputs pulses Sp12 corresponding to the pointer position (position of header byte $V_5$) and the position of the 36th byte from there ($V_5$). The header byte $V_5$ and the connecting destination byte J2 are latched at the latch means 443.

The path overhead latched at the latch means 413 to 443 in this way is input to the head check means 500 where the various information forming the path overhead is processed.

Figure 7:
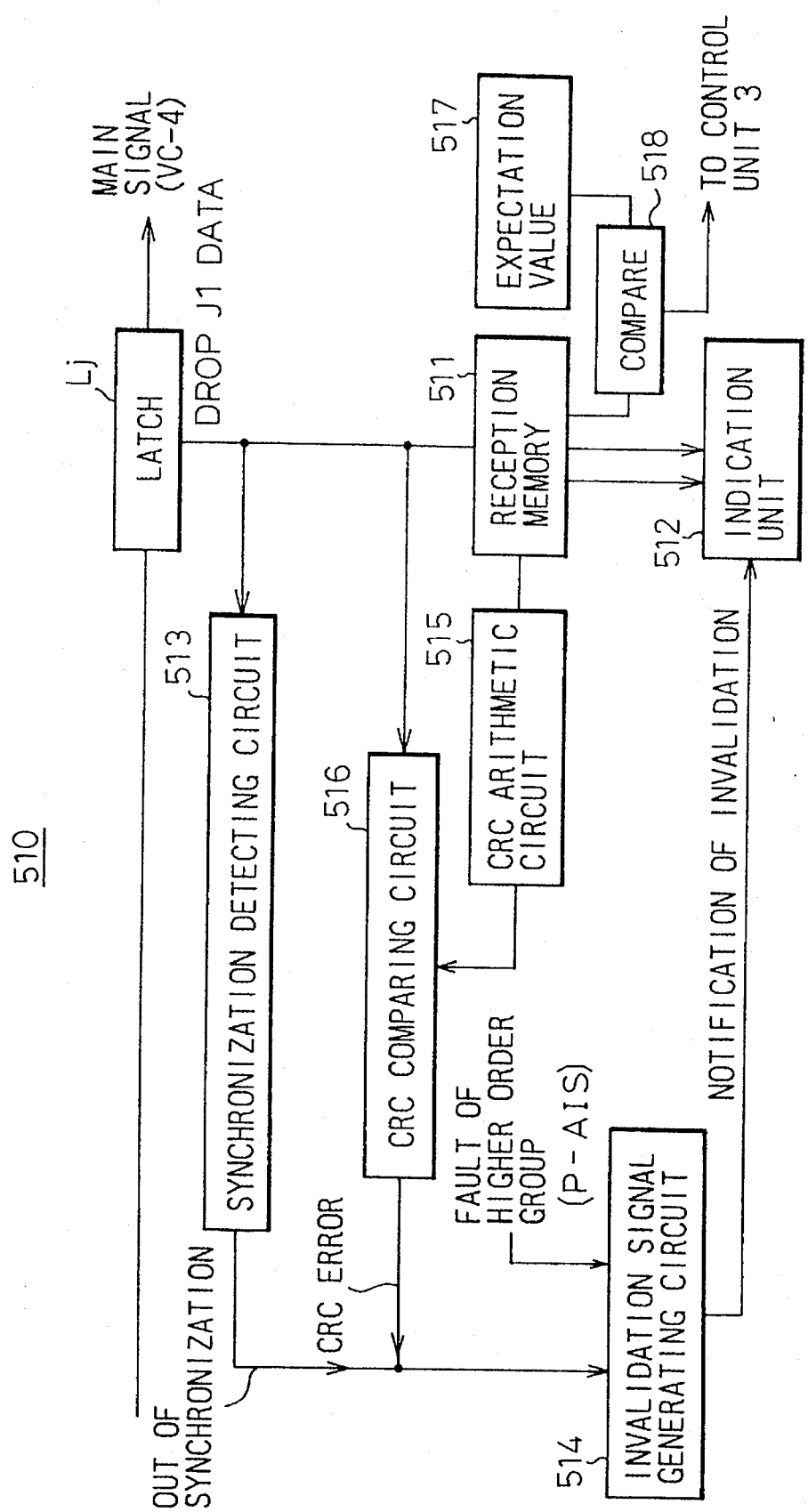
FIG. 7 is a block diagram of a connecting destination information processing means.

FIG. 7 is a block diagram showing the connecting destination information processing unit 510 constituting part of the head check means 500.

As explained above, the 16 connecting destination bytes J1 obtained from the virtual containers VC-4 and VC-3 and 16 connecting destination bytes J2 obtained from the virtual containers VC-2 and VC-12 represent a single connecting destination.

Figure 8:
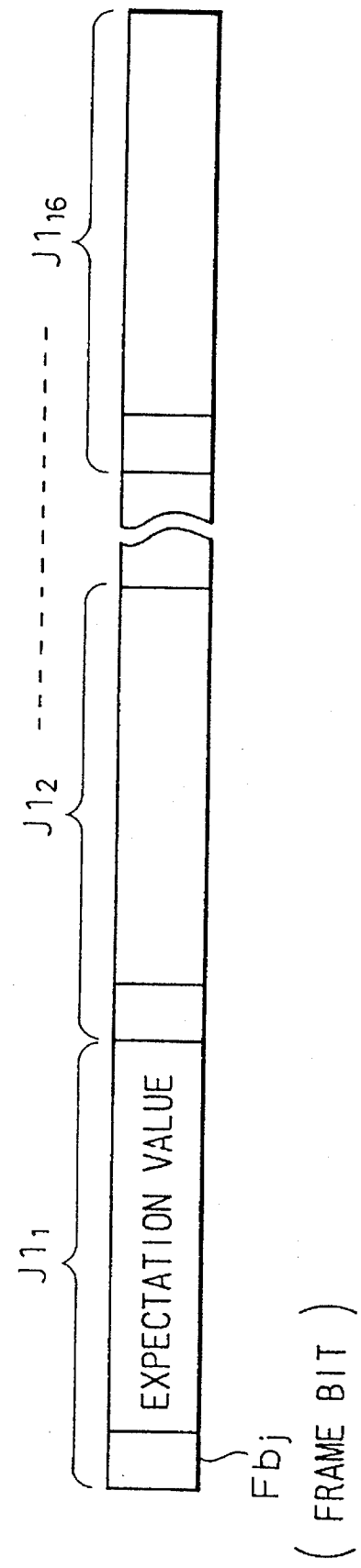
FIG. 8 is a conceptual view of the configuration of the connecting destination frame.

Explaining this taking as an example the connecting destination byte J1, as shown in FIG. 8, the header bits of the header connecting destination byte $J1_1$ constitute the flag (frame bit Fbj) indicating the header of one frame formed by the group of 16 connecting destination bytes $J1_k$ (k: 1 to 16).

As explained above, the connecting destination bytes $J1_k$ are held by the latch Lj (FIG. 7) forming the latch means 413 (423, 433, 443) and input to the next reception memory 511. The reception memory 511 is activated by the frame bit Fbj of the above header connecting destination byte $J1_1$, the 16 connecting destination bytes $J1_k$ are successively registered, and the content is shown on the display unit 512.

On the other hand, the connecting destination byte J1 is input to the synchronization detection circuit 513, where the timing of input of the frame bit Fb is detected. By this, it is detected if the connecting destination byte J1 input has lost synchronization. Here, if loss of synchronization is detected, the invalidation signal generating circuit 514 is activated and the display of the display unit 512 is invalidated.

Further, the connecting destination bytes $J1_k$ of one frame worth input to the reception memory 511 are successively read out from the receiving memory 511, the CRC is computed byte by byte by the CRC computing circuit 515, and the results are input to the CRC comparing circuit 516. On the other hand, the expected value of the CRC is placed in the 7 bits other than the frame bit Fb in the header byte of each frame and input to the CRC comparing circuit 516, so the comparing circuit 516 compares the results of the computation of the CRC for the received data and the expected value of the CRC of the next frame. If the result is that there is a difference between the two, then an error has occurred in the middle of the transmission, so the invalidation signal generating circuit 514 is activated and the display on the display unit 512 is made invalid. Further, the invalidation signal generating circuit 514 is activated as well when a higher order group fault such as a line disconnection occurs.

Further, it is of course also possible to record the content of one frame (16 J1 bytes) in the expected value memory 517 as it is as the expected value and to compare the content of the reception memory 511 and the content of the expected value memory 517.

Figure 9:
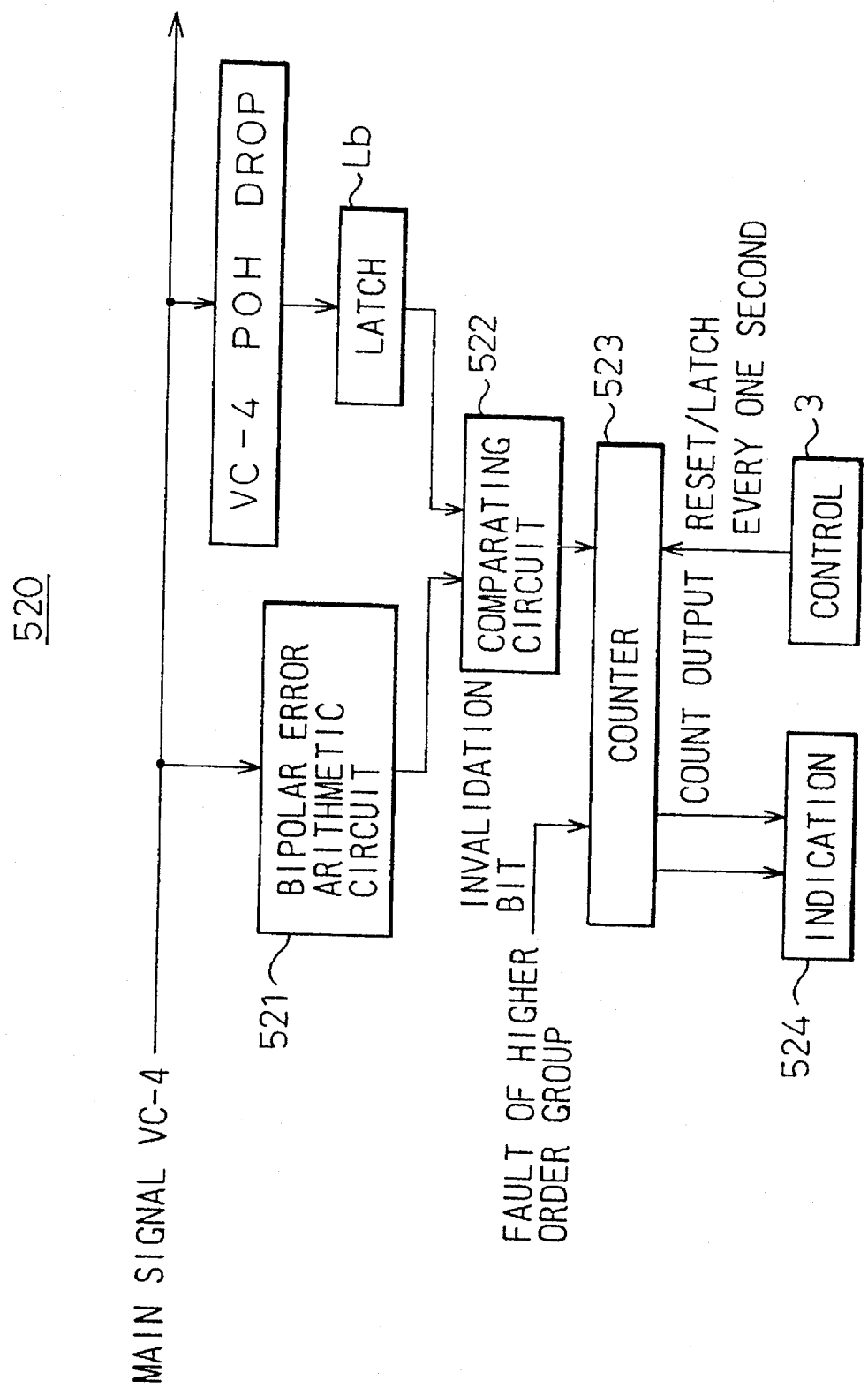
FIG. 9 is a block diagram of a bit error information processing means.

FIG. 9 is a block diagram of a bit error information processing means 520 constituting part of the head check means 50.

The main signal of the virtual container VC-m extracted in the above way is input to the bipolar error computing circuit 521 where the parities of the bit units are computed. The results are input to the comparator 522. Here, results of computation for the virtual containers VC-4 and VC-3 are shown in 8 bits, but the results of computation are shown for the virtual containers VC-2 and VC-12 in 2 bits.

On the other hand, the results of computation of the bipolar error detected at the preceding equipment are carried in the bit error byte B3 (first and second bits of the header byte $V_5$ for the virtual containers VC-2 and VC-12) and are latched at the latch Lb (FIG. 9) forming the above-mentioned latch means 413 (423, 433, 443). Therefore, a comparison is made of the bit error byte B3 (first and second bits) of the frame after the frame for which the above bit error was computed and the results of the computation of the above bit error. The counter 523 counts the number of errors occurring in a predetermined time frame. That value is shown on the display unit 524. The predetermined time frame is managed by the control means 3 such as a microcomputer. As the predetermined time frame, for example, 1 second is selected.

Figure 10:
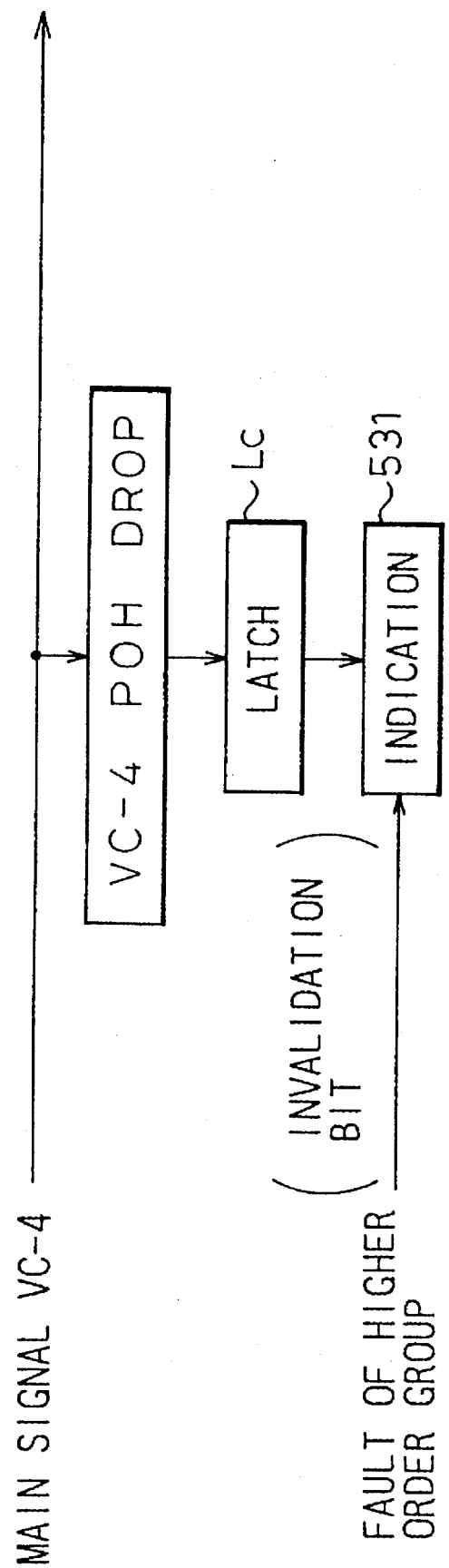
FIG. 10 is a block diagram of a mapping information processing means.

FIG. 10 is a block diagram of a mapping information processing means 530. In this case, it is enough to display the content latched in the latch Lc forming the above latch means 413 (423, 433, 443) by the display unit 531. Further, the display is invalidated when a higher order group fault occurs.

Figure 11:
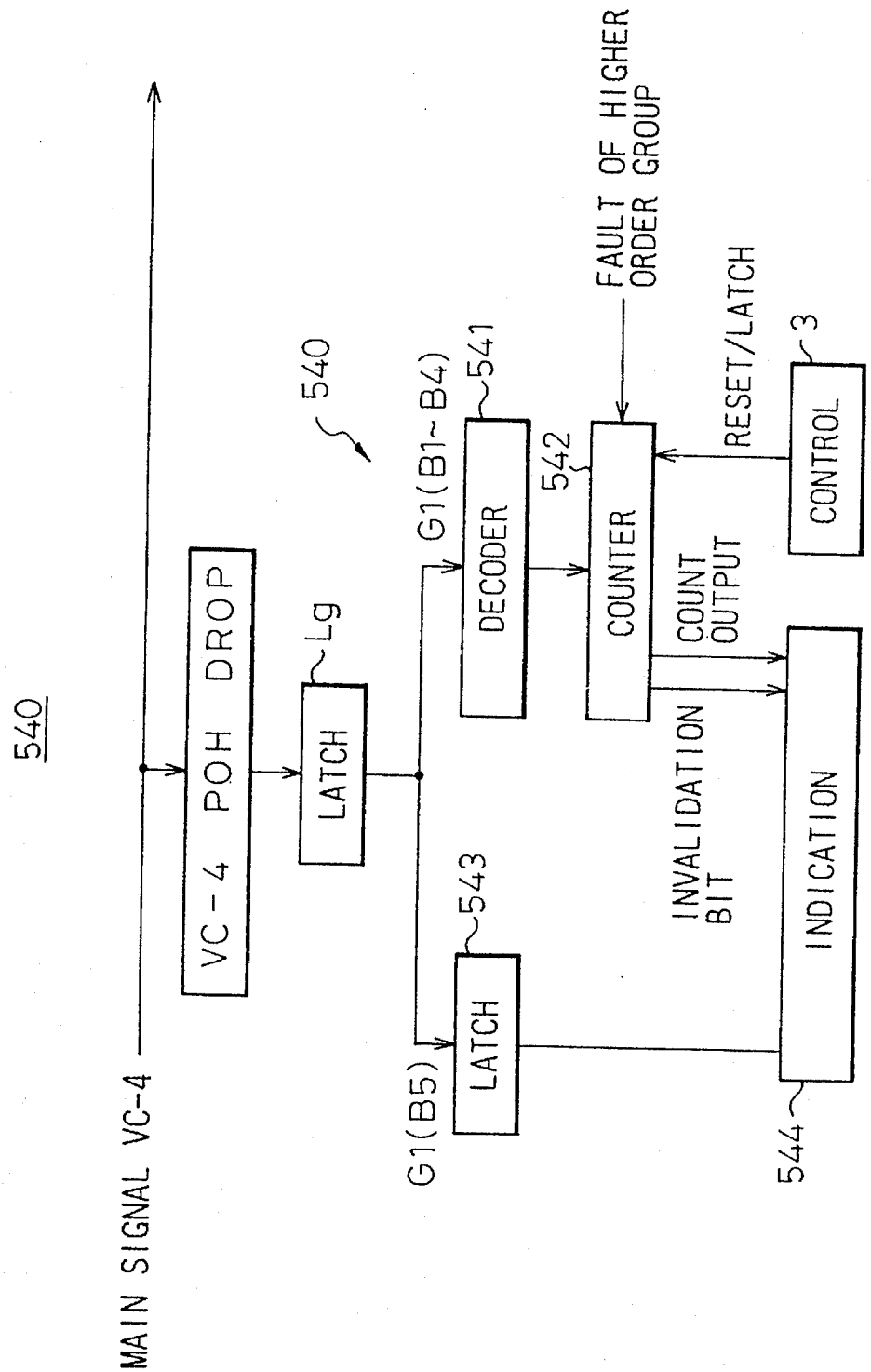
FIG. 11 is a block diagram of an error frequency information processing means.

FIG. 11 is a block diagram of an error frequency information processing unit 544. In the error frequency byte G1 latched at the latch Lg forming the latch means 413 (423, 433, 443), the first to fourth bits (the third bit of the header byte $V_5$ for the virtual containers VC-2, VC-12), that is, the number of errors received at the preceding equipment, is input to the decoder 541. Next, the next counter 542 counts the number of times that some number has been set at the decoder in a predetermined time frame and displays the result en the display unit 544. The predetermined time frame mentioned above is managed by the control means 3 in the same way as during a check of the connecting destination byte J1.

The fifth bit in the error frequency byte G1 latched in the latch Lg (the eighth bit of the header byte $V_5$ for the virtual containers VC-2, VC-12), that is, the flag showing if an error has occurred in the preceding equipment, is held in the latch 543 and shown on the display unit 544.

Above, the results of the detection at the processing units 510 to 540 were shown on a display unit, but it is of course also possible to input them into the control means 3 and operate an alarm unit etc.

Further, the explanation was given of a method of processing the path overhead POH by circuitry, but it is also possible to hold the path overheads POH of all the virtual containers VC-m of all the layers obtained from the demapping means 11 in the latch means as explained above and extract a specific virtual container VC-m by a program built into a microcomputer to check the control bytes (J1, J2, B3, C2, G1) or the control bits of the header byte $V_5$.

As explained above, the present invention enables output of the mapping means to be input to a line selection means and on the other hand guides it to a container selection means for extraction of a specific virtual container and checking of the path overhead of the specific virtual container, so it is possible to detect the path overhead without obstructing the normal transmission. Further, it is possible to set the virtual container desired by the operator in the container selection means of the different layers, so the operator can extract any desired virtual container.

Therefore, when an error occurs in the middle of a transmission, it is possible to quickly find the location of the error and therefore possible to improve the maintenance service.

While the invention has been described by reference to the specific embodiments chosen for purposes of illustration, it should be apparent that numerous modifications could be made thereto by those skilled in the art without departing from the basic concept and scope of the invention.

We claim:

1. An SDH transmission system for digital transmission using as a unit of transmission a synchronous transport module (STM-n) in which virtual containers (VC-m) are hierarchically mapped, said virtual containers being supplied through a demapping means in said system, said transmission system comprising a through path monitoring circuit including:

a container selection means for selectively extracting a specific virtual container (VC-m) of a particular hierarchy including uppermost layer virtual containers (VC-4), and a path overhead processing means for processing the path overhead of said specific virtual container (VC-m) obtained from the above container selection means.

2. An SDH transmission system as set forth in claim 1, wherein said container selection means is provided with an uppermost layer container selection means for selectively extracting the desired virtual container (VC-4) from among a plurality of uppermost layer virtual containers (VC-4), a container separating means for separating the lower layer virtual containers (VC-m) from the upper layer virtual container (VC-m), and a lower layer container selection means for selectively extracting the desired virtual container (VC-m) from among the virtual containers (VC-m) obtained from the container separating means.

3. An SDH transmission system as set forth in claim 1, wherein said path overhead processing means is provided with a head extraction means for extracting the path overhead (POH-m) from the extracted virtual container (VC-m) and a head check means for checking and displaying the state of the specific information byte in the path overhead extracted from the head extraction means.

4. An SDH transmission system as set forth in claim 2, wherein when what is processed by the path overhead processing means is the uppermost layer virtual container (VC-4) and said container separating means and lower layer container selection means are made idle.

5. An SDH transmission system as set forth in claim 2, further comprising one set of said container separating means and lower layer container selection means and to extract the virtual container (VC-m) of the desired layer.

6. An SDH transmission system as set forth in claim 5, wherein only one set of the container separating means and lower layer container selection means are made active to extract the virtual container (VC-3).

7. An SDH transmission system as set forth in claim 5, further comprising two sets of said container separating means and lower layer container selection means to extract the virtual container (VC-2).

8. An SDH transmission system as set forth in claim 5, further comprising three sets of said container separating means and lower layer container selection means to extract the virtual container (VC-12).

9. An SDH transmission system as set forth in claim 3, further comprising control means for setting the virtual containers (VC-m) to be selected by the uppermost layer container selection means and lower layer container selection means for selectively extracting the desired virtual container (VC-m) from among the virtual containers (VC-m) obtained from the container separating means.

10. An SDH transmission system as set forth in claim 3, wherein said head check means is provided with a connecting destination information processing unit for checking the connecting destination information of the virtual containers (VC-m).

11. An SDH transmission system as set forth in claim 10, wherein said connecting destination information processing means is provided with a CRC computing circuit for computing the CRC of the received connecting destination information and a comparison circuit for comparing the results of computation by the CRC computing circuit and the CRC expected value carried in the received data.

12. An SDH transmission system as set forth in claim 10, wherein said connecting destination information processing unit is provided with a comparison circuit for comparing the received connecting destination information and the expected value of the connecting destination information stored in an expected value memory in advance.

13. An SDH transmission system as set forth in claim 3, wherein said head check means is provided with a bit error processing unit for checking the bit error information showing the bit errors of virtual containers (VC-m).

14. An SDH transmission system as set forth in claim 13, wherein said bit error processing unit is provided with a bipolar error computing circuit for computing the parity of received data, a comparison circuit for comparing the results of the computation by the bipolar error computing circuit and the bit error information carried in the received data, and a counter for counting the number of times of occurrence of bit error in a predetermined time frame by counting the results of the comparison.

15. An SDH transmission system as set forth in claim 3, wherein said head check means is provided with a mapping information processing unit for checking mapping information of the virtual containers (VC-m).

16. An SDH transmission system as set forth in claim 3, wherein said head check means is provided with an error frequency information processing unit for checking the error frequency information showing the number of errors in a virtual container (VC-m).

17. An SDH transmission system as set forth in claim 16, wherein said error frequency processing unit is provided with a decoder for detecting the occurrence of error by said error frequency information and a counter for counting the number of times of occurrence of error in a predetermined time frame by the results of the detection by the detector.

* * * * *